United States Patent [19]

Hirata et al.

[11] 3,975,463

[45] Aug. 17, 1976

[54] MOLDED STRUCTURES CONTAINING CRYSTALLING POLYOLEFIN SAPONIFIED ETHYLENE VINYL ACETATE COPOLYMER AND CARBONYL CONTAINING COPOLYMERS

[75] Inventors: Sadao Hirata, Yokohama; Muneki Yamada; Akira Kishimoto, both of Tokyo, all of Japan

[73] Assignee: Toyo Seikan Kaisha Limited, Tokyo, Japan

[22] Filed: Aug. 9, 1974

[21] Appl. No.: 496,323

Related U.S. Application Data

[62] Division of Ser. No. 261,804, June 12, 1972, Pat. No. 3,857,754.

[30] Foreign Application Priority Data

June 18, 1971  Japan.............................. 46-43356
Jan. 14, 1972  Japan.............................. 47-5810

[52] U.S. Cl....................... 260/897 B; 260/857 L; 260/859 R; 260/873; 264/176 R; 426/106; 428/35
[51] Int. Cl.²........................................ C08L 23/00
[58] Field of Search.............. 260/897 B; 264/176 R

[56] References Cited
UNITED STATES PATENTS

| | | | |
|---|---|---|---|
| 3,182,101 | 5/1965 | Rees................................ | 260/897 B |
| 3,226,455 | 12/1965 | Matsubayashi.................. | 260/897 B |
| 3,361,852 | 1/1968 | Bassett............................ | 260/897 B |
| 3,375,219 | 3/1968 | Robb................................ | 260/857 L |
| 3,399,250 | 8/1968 | Kirk................................. | 260/897 B |
| 3,410,928 | 11/1968 | Baum.............................. | 260/897 B |
| 3,422,055 | 1/1969 | Maloney......................... | 260/897 B |
| 3,426,107 | 2/1969 | Scruggs........................... | 260/897 B |
| 3,445,546 | 5/1969 | Pledger........................... | 260/897 B |
| 3,454,512 | 7/1969 | Ahmed............................ | 260/857 L |
| 3,524,905 | 8/1970 | Coates............................. | 260/897 B |
| 3,549,727 | 12/1970 | Coates............................. | 260/897 B |
| 3,615,106 | 10/1971 | Flanagan......................... | 260/897 B |
| 3,636,136 | 1/1972 | Konipik........................... | 260/857 L |
| 3,663,663 | 5/1972 | McAda............................ | 260/897 B |
| 3,879,492 | 4/1975 | Bontinick........................ | 260/857 L |

*Primary Examiner*—Paul Lieberman
*Attorney, Agent, or Firm*—Diller, Brown, Ramik & Wight

[57] ABSTRACT

A resinous composition excellent in processability and gas permeation resistance, which comprises (A) 30 to 98 % by weight of a crystalline polyolefin, (B) 2 to 70 % by weight of a saponified product of an ethylene-vinyl acetate copolymer having an ethylene content of 25 to 75 mole % and a degree of saponification of at least 93 %, and (C) 0.5 to 15 parts by weight, per 100 parts by weight of said polyolefin and ethylene-vinyl acetate copolymer saponified product, of a thermoplastic polymer containing a carbonyl group in the main or side chain thereof, and a molded structure formed therefrom, which has a specific multi-layer structure and a high gas permeation resistance.

8 Claims, 8 Drawing Figures

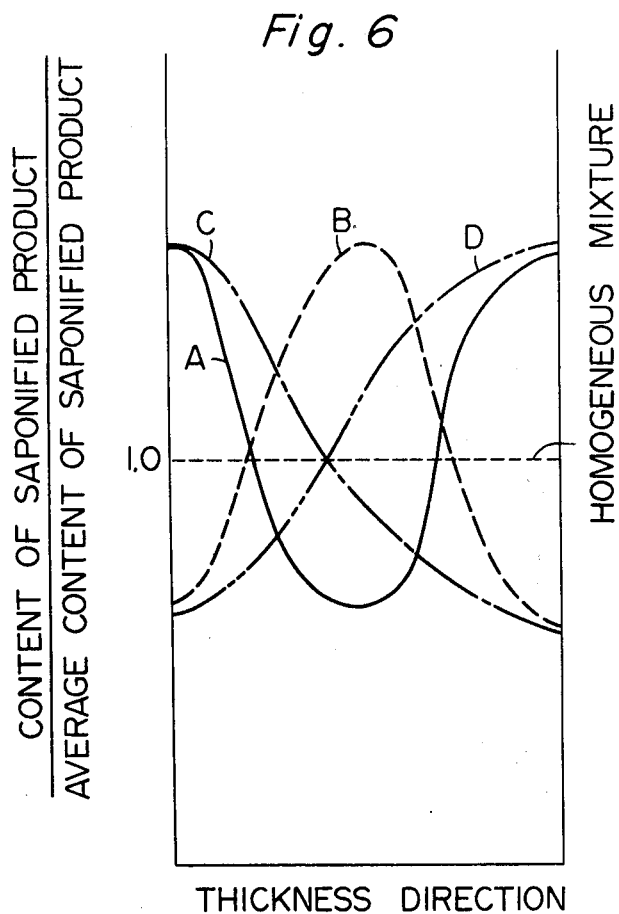
Fig. 6
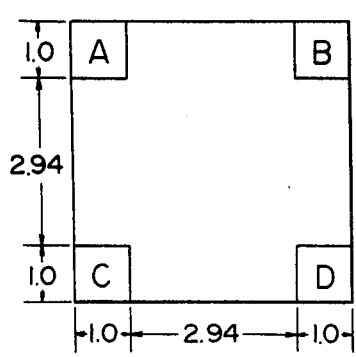
Fig. 7-A
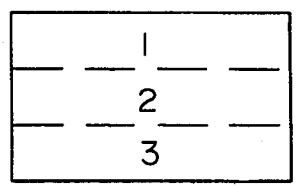
Fig. 7-B

MOLDED STRUCTURES CONTAINING CRYSTALLING POLYOLEFIN SAPONIFIED ETHYLENE VINYL ACETATE COPOLYMER AND CARBONYL CONTAINING COPOLYMERS

This is a division of Ser. No. 261,804, filed June 12, 1972, now U.S. Pat. No. 3,857,754.

This invention relates to a novel resinous composition being excellent in processability and gas permeation resistance and a molded structure thereof. More particularly, the invention relates to a resinous composition having improved processability and gas permeation resistance which comprises a blend of a polyolefin, especially a low density polyethylene, a saponified product of an ethylene-vinyl acetate copolymer and a carbonyl group-containing thermoplastic polymer, and a molded structure of such resinous composition. More detailedly, the invention relates to a molded article having a structure characterized by a novel layer distribution, which is formed from a molten mixture comprising a polyolefin, a saponified product of an ethylenevinyl acetate copolymer and a carbonyl group-containing thermoplastic polymer, especially a molded article such as film, sheet, container or tube having a structure of a novel layer distribution excellent in gas permeation resistance.

Polyolefins have heretofore been broadly used as packaging materials for foodstuffs and the like by dint of excellent mechanical strength and sanitariness. However, polyolefins are fatally defective in that permeability of gases such as oxygen and carbon dioxide gas is very high, and polyolefins are still insufficient in that foodstuffs cannot be preserved for a long time with use of containers or the like formed of polyolefins.

In order to improve the gas permeation resistance in polyolefins methods have been proposed to copolymerize ethylene with various vinyl monomers. For instance, U.S. Pat. No. 3,419,654 discloses the use of a saponified product of an ethylene-vinyl acetate copolymer. Although such saponified product is advantageous over polyolefins in the point that its oxygen permeability is much smaller than that of polyolefins, it is still defective in that its water vapor permeability is high because of its hydrophilic properties and that its mechanical strength, especially impact resistance, is considerably low.

We have now found that when an ethylene-vinyl acetate copolymer saponified product and a polyolefin such as low density polyethylene, each having the defects such as mentioned above, are blended at a specific ratio which will be detailed hereinbelow, there can be obtained a resinous composition in which permeability of ordinary gases such as oxygen, water vapor and carbon dioxide gas is extremely low and which is excellent in mechanical properties such as impact resistance and physical properties such as transparency, and that when a specific amount of a carbonyl group-containing thermoplastic polymer is incorporated in such resinous composition, the processability of the composition at the molding operation can be highly improved while the above-mentioned characteristic properties are retained, and the resulting molded article is highly improved in surface smoothness and uniformity.

It has also been found that when the above-mentioned polyolefin, ethylene-vinyl acetate copolymer saponified product and carbonyl group-containing thermoplastic polymer are melt blended at specific ratios which will be explained hereinbelow and the molten mixture is extruded and molded under such specific extrusion conditions that the difference between the average flow rate of the polyolefin melt and the average flow rate of the ethylene-vinyl acetate copolymer saponified product is at least 1 cm/sec, there can be obtained a molded structure in which the polymer composition is different in the thickness direction but substantially identical in the plane direction and which has a layer structure wherein layers are continuous with respect to the plane direction; in such molded structure, there are formed layers containing the ethylene-vinyl acetate copolymer saponified product at a ratio exceeding the average content and layers containing the polyolefin at a ratio exceeding the average content, and by dint of such specific layer structure, the molded structure exhibits an extremely low permeability of ordinary gases such as oxygen, water vapor and carbon dioxide gas and is excellent in mechanical properties such as stiffness and impact resistance and physical properties such as transparency; and that in preparation of such molded structure, when a specific amount of a carbonyl group-containing thermoplastic polymer is added to the above-mentioned polyolefin and ehtylene-vinyl acetate copolymer saponified product, the surface smoothness and uniformity of the molded structure can be highly improved while the above-mentioned desirable properties are retained as they are, and the processability of the composition at the molding operation can be highly improved.

In the instant specification, it is defined that in a hollow molded structure, the plane direction means the peripheral direction of the structure and the thickness direction means the direction vertical to said plane direction, namely the radial direction.

Accordingly, an object of this invention is to provide a novel resinous composition which has an excellent gas permeation resistance similarly against oxygen, water vapor, carbon dioxide gas, etc. and which is excellent in mechanical properties such as impact resistance, softness and toughness, physical properties such as transparency, and processability, especially melt-moldability.

Another object of this invention is to provide a novel resinous composition which can readily be molten and extrusion molded into films, containers and other molded articles and which can give a molded resin article excellent in the surface smoothness and uniformity.

A further object of this invention is to provide a molding resinous composition which can be suitably used for formation of packaging materials for foodstuffs or the like, such as films bags, bottles and tubes.

Still another object of this invention is to provide a molded structure of a novel layer structure which exhibits an excellent gas permeation resistance similarly against oxygen, water vapor, carbon dioxide gas, etc. and which is excellent in mechanical properties such as stiffness and impact resistance.

A still further object of this invention is to provide a novel molded structure which has a layer structure in which the polymer composition is different in the thickness direction but substantially identical in the plane direction and layers are continuous with respect to the plane direction, in spite of the fact that the molded structure is formed from a molten mixture comprising a polyolefin and a saponified product of an ethylene-vinyl acetate copolymer.

A still further object of this invention is to provide a molded structure having a novel layer structure comprising layers containing a saponified product of an ethylene-vinyl acetate copolymer at a ratio exceeding the average content, and layers containing a polyolefin at a ratio exceeding the average content, wherein every two adjacent layers are bonded to each other without any intermediate bonding layer of an adhesive.

A still further object of this invention is to provide a molding method according to which a molded structure of the above-mentioned novel layer structure can readily be prepared by only one extrusion molding apparatus.

In accordance with this invention, there is provided a resinous composition excellent in processability and gas permeation resistance, which consists essentially of (A) 30 to 98 % by weight of a crystalline polyolefin, particularly a low density polyethylene having a density of less than 0.929 g/cc, especially less that 0.928 g/cc, (B) 2 to 70 % by weight of a saponified product of an ethylene-vinyl acetate copolymer having an ethylene content of 25 to 75 mole % and a degree of saponification of at least 93 %, and (C) 0.5 to 15 parts by weight, per 100 parts by weight of the sum of said crystalline polyolefin and said ethylene-vinyl acetate copolymer saponified product, of a thermoplastic polymer containing a carbonyl group in its main or side chain.

In accordance with one preferable embodiment of this invention, there is provided a molded structure formed from a molten mixture containing (A) a polyolefin and (B) a saponified product of an ethylene-vinyl acetate copolymer having an ethylene content of 25 to 50 mole % and a degree of saponification of at least 96 % at a weight ratio of A : B ranging from 95 : 5 to 75 : 25, and (C) 0.5 to 15 parts by weight, per 100 parts by weight of the sum of said polyolefin and said ethylenevinyl acetate copolymer saponified product, of a thermoplastic polymer containing a carbonyl group in its main or side chain, said molded structure having a layer structure in which the polymer composition is different in the thickness direction but substantially identical in the plane direction and every two adjacent layers are bonded to each other without any intermediate bonding layers of an adhesive, wherein when said molded structure is divided in three layers in the thickness direction, at least one layer contains the ethylene-vinyl acetate copolymer saponified product in an amount expressed by the following formula $$M_1 = m_1^x$$

wherein X is the average content (% by weight) of the ethylene-vinyl acetate copolymer saponified product in said molded structure, $m_1$ is a number of from 1.2 to 4, and $M_1$ is the content (% by weight; which is sometimes called "concentration") of the ethylene-vinyl acetate copolymer saponified product in said layer, and at least one layer contains the ethylene-vinyl acetate copolymer saponified product in amount expressed by the formula $$M_2 = m_2 X$$

wherein X is as defined above, $m_2$ is a number of from 0 to 0.9, and $M_2$ is the content (% by weight) of the ethylene-vinyl acetate copolymer saponified product in said layer. This invention will now be illustrated more detailedly.

Resinous Composition

The saponified product of an ethylene-vinyl acetate copolymer to be used in the molded structure of this invention is obtained by saponifying an ethylenevinyl acetate copolymer having an ethylene content of 25 to 75 mole % so that the degree of saponification reaches at least 93 %, especially at least 96 %. In case the ethylene content exceeds 75 mole % in the saponified copolymer, the gas permeation resistance (gas-barrier property) against gases such as oxygen is lost, and the objects of this invention cannot be attained. In case the ethylene content of the saponified copolymer is less than 25 mole %, the composition exhibits a high hydrophilic property and its water vapor permeability becomes high with degradation of its moldability. Accordingly, use of such saponified copolymer is not suitable for attaining the objects of this invention.

In order for the molded structure to have an improved gas permeation resistance, it is essential that the degree of saponification should be at least 93 %, especially at least 96 %.

A saponified product of an ethylene-vinyl acetate copolymer to be especially preferably used in this invention has an ethylene content of 25 to 50 mole % and a degree of saponification of at least 99%.

The molecular weight of the ethylene-vinyl acetate copolymer saponified product to be used in this invention is not particularly critical, as far as it is in general within the range capable of forming films. In general, the viscosity of the ethylene-vinyl acetate copolymer saponified product is measured with use of a mixed solvent of 85 % by weight of phenol and 15 % by weight of water. In this invention, it is preferred that the ethylenevinyl acetate copolymer saponified product used has an intrinsic viscosity ($\eta$), measured at 30°C. in such mixed solvent, of from 0.07 to 0.17 l/g. In the case of a saponified copolymer having an intrinsic viscosity ($\eta$) of lower than 0.07 l/g, the mechanical strength of the final molded article is insufficient, and in the case of a saponified copolymer having an intrinsic viscosity ($\eta$) exceeding 0.17 l/g, the moldability of the resulting resinous composition tends to be lowered.

In this invention, selection of a polyolefin among various thermoplastic resins and formation of a molten mixture by combining so selected polyolefin with an ethylene-vinyl acetate copolymer saponified product are very important for improving the gas permeation resistance in the final molded structure and for obtaining a molded structure having the above-mentioned specific layer structure. According to this invention, the use of this combination of the polyolefin and saponified copolymer results in a molded structure having an excellent gas permeation resistance similarly against all of ordinary gases such as oxygen, water vapor and carbon dioxide gas and excellent physical properties such as good stiffness, high impact resistance and high transparency.

Any of polyolefins which have heretofore been used for molding of films or containers and the like broadly in the art may be used as the polyolefin in this invention. As such polyolefin, there may be employed homopolymers and copolymers of olefins expressed by the following formula

wherein R is a hydrogen atom or an alkyl group having up to 4 carbon atoms.

In order to obtain a molded article having sufficient mechanical strength from such polyolefin, it is essential that the olefin homopolymer or copolymer should be crystalline. As such crystalline polyolefin there may be mentioned, for instance, low density polyethylene, medium density polyethylene, high density polyethylene, isotactic polypropylene, crystalline ethylene-propylene copolymer, polybutene-1 and polypentene-1. Of course, in this invention the polyolefin to be used is not limited to olefin homopolymers and copolymers of two or more olefins, but copolymers comprising a small amount, for instance, up to 5 mole %, of other ethylenically unsaturated comonomer within a range such as will not substantially damage the properties of the polyolefin, may be used. As such comonomer component, there may be exemplified vinyl chloride, vinyl acetate, acrylic acid, esters thereof, methacrylic acid and esters thereof.

In general, the molecular weight of the polyolefin is not particularly critical in this invention, as far as it is within the film-forming range. For instance, a polyolefin having an average molecular weight of from 5,000 to 400,000 (corresponding to a melt index, MI (measured according to ASTM 1238) from 0.05 to 5.0 g/10 min) is used preferably in general.

Polyolefins to be preferably used in this invention are, expressed in the order of importance, (I) a low density polyethylene having a density of from 0.917 to 929 g/cc, (II) a medium density polyethylene having a density of from 0.930 to 0.939 g/cc, (III) a high density polyethylene having a density of at least 0.940 g/cc, and (IV) an isotactic polypropylene. In this invention, the use of a low density polyethylene having a density of less than 0.929 g/cc is especially preferred. More specifically, in accordance with a preferable embodiment of this invention, a low density polyethylene is especially selected among various thermoplastic resins and combined with a carbonyl group-containing polymer, any by a simple operation of blending this combination of the low density polyethylene and carbonyl group-containing polymer with a saponified product of an ethylene-vinyl acetate copolymer, there can readily be obtained a composition having a desired combination of high gas permeation resistance, high impact resistance and high transparency. It is important that the low density polyethylene to be used in the composition of the above preferable embodiment of this invention should have a density of less than 0.929 g/cc. Other polyethylenes having a density of greater than 0.929 g/cc, for instance, medium pressure process polyethylenes or low pressure process polyethylenes (high density polyethylenes), have a tendency to give, in general, a poor transparency when blended with an ethylene-vinyl acetate copolymer saponified product. Further, a vessel or container molded from a resinous composition comprising such polyethylene is inferior in softness characteristics such as sque squeezing property. Of course, in this invention, in preparing containers of which transparency is not required or containers of which a rigid property is required, it is possible to employ medium density polyethylene, high density polyethylene and isotactic polypropylene.

In this invention, when combination of a polyolefin, especially a low density polyethylene with the said saponified ethylene-vinyl acetate copolymer is used, by employing the molding procedures which will be detailed hereinbelow, it is made possible to manifest very prominently the characteristic feature in the molded structure of this invention, that is, the feature of the specific layer structure constructed of layers differring from each other in the resin composition, and to improve such properties as gas permeation resistance, transparency, and impact resistance greatly.

It has been disclosed in the specification of Japanese Patent Publication No. 31758/70 that when a saponified product of an ethylene-vinyl acetate copolymer is blended with an acrylonitrile-butadiene copolymer, the impact resistance of the saponified ethylene-vinyl acetate copolymer is improved. However, the specification of said Japanese Patent Publication clearly teaches that since there is no complete compatibility between the ethylene-vinyl acetate copolymer saponified product and acrylonitrile-butadiene copolymer, the resulting resinous blend is semi-transparent. Thus, it is shown that this resinous composition has a defect with respect to transparency.

It may be considered to blend an ethylene-vinyl acetate copolymer saponified product with other rubbery polymer such, for example, as an ethylene-propylene copolymer, a polyisobutylene, a chlorosulfonated polyethylene, a polyisoprene, a polysulfurized rubber, a polychloroprene or a styrene-butadiene copolymer. However, the specification of above-mentioned Japanese Patent Publication No. 31758/70 teaches that in these blends the impact resistance is not at all improved, or is slightly improved by incorporation of a great amount of such rubbery polymer.

Attempts to obtain a resinous composition excellent in gas permeation resistance, impact resistance and transparency by graft or block polymerizing an ethylene-vinyl acetate copolymer saponified product with other monomer or polymer have been known. For instance, the specification of Japanese Patent Publication No. 32275/70 teaches that when ε-caprolactam is added to a saponified product of an ethylene-vinyl acetate copolymer and the mixture is polymerized under heat, there is obtained a blocked, grafted or partially cross-linked product composed of combined saponified copolymer and poly-ε-caprolactam and that the abovementioned characteristics are improved in the resulting resinous product. Further, in Chemical Abstracts, vol. 73 (1970), 15729 a, it is disclosed that when a high density polyethylene not masticated after polymerization and a saponified product of an ethylene-vinyl acetate copolymer are kneaded together with a free-radical-forming catalyst under heat and pressure to form a block-graft copolymer, there is obtained a product excellent in gas permeation resistance, anti-stress-cracking property and resistance against thermal shrinkage.

However, each of these known techniques is industrially and economically disadvantageous in that special operations and materials are required for accomplishing the block or graft copolymerization, and each of resinous compositions obtained according to such known techniques cannot escape from a defect of degradation in moldability because the cross-linked structure should inevitably be introduced at the block or graft copolymerization.

In contrast to these known techniques, when a low density polyethylene is used and coupled with a carbonyl group-containing polymer, a molded structure having the above-mentioned desired combination of excellent gas permeation resistance, impact resistance and transparency can be obtained merely by blending, melting and molding. Further, the melt-extrusion molding of the resinous blend can be accomplished very easily, with high improvement of the surface smoothness and uniformity in the resulting molded structure. This feature is quite unobvious and unexpected from the conventional knowledge that is case polyolefin is used in combination with a saponified product of an ethylene-vinyl acetate copolymer, it is necessary to perform the block- and graft-copolymerization between both polymer.

Of course, in a molded product of the above-mentioned specific multi-layer structure according to this invention, it is possible to improve mechanical properties such as stiffness, tensile strength and tear strength by employing high density polyethylene or isotactic polypropylene.

In the resinous composition of this invention, it is especially important that 30 to 98 % by weight of a crystalline polyolefin, especially a low density polyethylene such as mentioned above, is mixed with 2 to 70 % by weight of a saponified product of an ethylene-vinyl acetate copolymer. From the experimental data shown in Examples given hereinbelow, it can readily be understood that by employing a polyolefin, especially a low density polyethylene, and a saponified product of an ethylene-vinyl acetate copolymer at the above specific ratio specified in this invention, it is possible to maintain a permeability of oxygen or carbon dioxide gas at a level much lower than the level attained by the single use of the polyolefin, and at the same time, the water vapor permeability is about 1/10 of the water vapor permeability observed when the saponified ethylene-vinyl acetate copolymer alone is used. Still further, as compared with the case of the single use of the saponified ethylene-vinyl acetate copolymer, the impact resistance can be highly improved by the use of the above combination of the polyolefin and saponified ethylene-vinyl acetate copolymer.

Moreover, by adjusting the mixing ratio of the polyolefin and saponified ethylene-vinyl acetate copolymer within the above-mentioned range, it is made possible to improve the physical properties such as toughness and softness very highly, as compared with the single use of the saponified ethylene-vinyl acetate copolymer.

The resinous composition of this invention comprises, in addition to the above polyolefin and saponified ethylene-vinyl acetate copolymer, a thermoplastic polymer containing a carbonyl group in the main or side chain in an amount of 0.5 to 15 parts by weight per 100 parts of the sum of the polyolefin and saponified copolymer. Incorporation of this carbonyl group-containing thermoplastic polymer improves not only the surface smoothness and uniformity of the resulting molded structure but also the processability and workability of the composition at the molding operation.

As such carbonyl group-containing thermoplastic polymer, there may optionally be employed any of thermoplastic polymers containing in the main or side chain carbonyl groups from free carboxylic acids, carboxylic acid salts, carboxylic acid esters, carboxylic anhydrides, carboxylic acid amides, carbonic acid esters, urethane and urea. Examples of such polymer will now be described.

a. Homopolymers or copolymers of monomers expressed by the following formula (I), and copolymers of monomers expressed by the formula (I) with olefins such as ethylene and propylene or other vinyl monomers such as styrene, vinyl chloride, vinyl acetate and acrylonitrile:

wherein $R_1$ is a hydrogen atom or a lower alkyl group having up to 4 carbon atoms, and $R_2$ is a hydrogen atom or an alkyl group having 1 to 12 carbon atoms.

Specific examples of the polymer of this type are polyacrylic acid esters, polymethacrylic acid esters, ethylene/acrylic acid ester copolymers, acrylic acid ester/acrylic acid copolymer, ethylene/acrylic acid ester/acrylic acid copolymers, ethylene/acrylic acid copolymers, styrene/methacrylic acid ester/acrylic acid copolymers, acrylic acid ester/vinyl chloride copolymers, methacrylic acid ester/vinyl chloride copolymers, styrene/methacrylic acid ester/butadiene copolymers, and methacrylic acid esters/acrylonitrile copolymers.

b. Homopolymers or copolymers of vinyl esters expressed by the following formula (II), and copolymers of monomers expressed by the formula (II) with olefins such as ethylene or other carbonyl group-free vinyl monomers:

wherein $R_3$ is a hydrogen atom or an alkyl or phenyl group.

Specific examples of the polymer of this type are polyvinyl acetate, polyvinyl propionate, ethylene/vinyl acetate copolymers, acrylic acid ester/vinyl acetate copolymers, and vinyl chloride/vinyl acetate copolymers.

c. Ionomers, that is, resins obtained by neutralizing copolymers of olefins with unsaturated carboxylic acids and optionally other vinyl monomers, with an alkali metal, an alkaline earth metal, zinc or an organic base.

Specific examples of the polymer of this type are Surlyns marketed by E. I. du Pont de Nemours & Co., U.S.A.

d. Copolymers of maleic anhydride with other vinyl monomers.

Specific examples of the polymer of this type are maleic anhydride/vinyl ether copolymers, and maleic anhydride/vinyl chloride copolymers.

e. Polyamides composed of the recurring units expressed by the formula

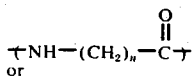
or

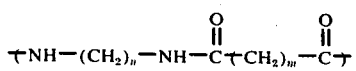

wherein $n$ is a number of from 3 to 13 and $m$ is a number of from 4 to 11.

Specific examples of the polymer of this type are poly-ω-aminocaroic acid, poly-ω-aminoheptanoic acid, poly-ω-aminocaprylic acid, poly-ω-aminopelagonic acid, poly-ω-aminodecanoic acid, poly-ω-aminoundecanoic acid, poly-ω-aminotridecanoic acid, polyhexamethylene adipamide, polyhexamethylene sebacamide, polyhexamethylene dodecamide, polyhexamethylene tridecamide, polydecamethylene adipamide, polydecamethylene sebacamide, polydecamethylene dodecamide, polydecamethylene tridecamide, polydodecamethylene adipamide, polydodecamethylene sebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene azelamide, polydecamethylene azelamide, polydodecamethylene azelamide, and polytridecamethylene azelamide.

f. Polyesters composed of the recurring units expressed by the formula

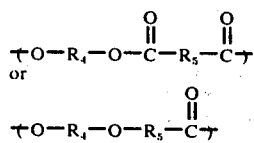

wherein $R_4$ is an alkylene group of 2 to 6 carbon atoms, and $R_5$ is an alkylene or arylene group of 2 to 24 carbon atoms.

Specific examples of the polymer of this type are polyethylene adipate, polyethylene sebacate, polyethylene terephthalate, polytetramethylene isophthalate, and polyethylene terephthalate/isophthalate.

g. Polyureas composed of the recurring units expressed by the formula

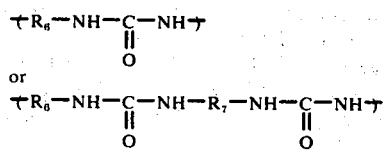

wherein $R_6$ and $R_7$ stand for an alkylene group of 1 to 13 carbon atoms.

Specific examples of the polymer of this type are polyhexamethyleneurea, polyheptamethyleneurea, polyundecamethyleneurea and polynonamethyleneurea.

h. Polyurethanes or polyureaurethanes expressed by the formula

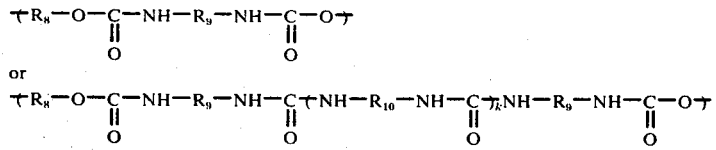

wherein $R_8$ is an alkylene group of 3 to 24 carbon atoms, or a polyether or polyester residue, $R_9$ is an alkylene or arylene group of 3 to 24 carbon atoms, $R_{10}$ is an alkylene or arylene group of 1 to 13 carbon atoms, and $k$ is 0 or 1.

Specific examples of the polymer of this type are polytetramethylenehexamethylene, polyhexamethylenetetramethylenethane, and polyurethanes formed by chain-extending isocyanate-terminated polyesters or polyethers with a diamine or water.

i. Polycarbonates composed of the recurring units expressed by the formula

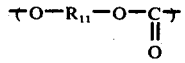

wherein $R_{11}$ is a hydrocarbon group of 8 to 15 carbon atoms.

Specific examples of the polymer of this group are poly-p-xyleneglycol biscarbonate, poly-dihydroxydiphenyl-methane carbonate, poly-dihydroxydiphenylethane carbonate, poly-dihydroxyphenyl-2,2-propane carbonate, and poly-dihydroxydiphenyl-1,1-ethane carbonate.

It is desired that the carbonyl group-containing polymer to be used in this invention contains carbonyl groups based on functional groups of free carboxylic acids, carboxylic acid salts, carboxylic acid esters, carboxylic acid amides, carboxylic anhydrides, carbonic acid esters, urethane and urea, in an amount of 120 to 1400 milliequivalents per 100 g of the polymer.

Such carbonyl group-containing polymers should be substantially linear and be molten at temperatures for melt molding the resulting resinous composition, for instance, at 170° to 300°C., preferably 180° to 250°C.

Carbonyl group-containing polymers which are readily available, can be easily blended and are very effective for improving the processability of the final resinous composition, that is, polymers which are especially suitable for attaining the objects of this invention, are polyvinyl acetate; copolymers of ethylene with a vinyl monomer containing a carboxylic acid salt group, such as vinyl acetate/ethylene copolymers, acrylic acid/ethylene copolymers, ethyl acrylate/ethylene copolymers and ionomers; and aliphatic polyamides such as poly-ω-aminocaproic acid, poly-ω-aminoundecanoic acid, poly-ω-aminododecanoic acid, polyhexamethylene adipamide and polyhexamethylene sebacamide.

The molecular weight of the carbonyl group-containing polymer to be used is not particularly critical, as far as it is within such range that the polymer can be molded into a film or vessel.

In order to improve the processability of the resinous composition and the surface smoothness of the molded structure, it is important that the resinous composition should comprise a carbonyl group-containing polymer in an amount of 0.5 to 15 parts by weight per 100 parts by weight of the sum of a polyolefin, especially a low density polyethylene, and a saponified product of an ethylene-vinyl acetate copolymer.

A resinous composition comprising a saponified product of an ethylene-vinyl acetate copolymer and a polyolefin is relatively sufficient in that the composition has an excellent gas permeation resistance and a high impact resistance, but it is defective in that it is inferior in processability, namely melt-extrusion moldability, to a polyolefin or a saponified ethylene-vinyl acetate copolymer alone. Further, a molded article composed of a resinous composition of said polyolefin, especially low density polyethylene and saponified copolymer has transparency, but it is defective in that it frequently has a craped appearance and it lacks the surface smoothness and uniformity.

This defect is conspicuous especially when the ethylene content of the saponified ethylene-vinyl acetate copolymer is low and hence, the hydroxyl group concentration is high, or when the amount incorporated of the saponified copolymer is great in the resinous composition.

When such resinous composition comprising the polyolefin and saponified copolymer is incorporated with the above-mentioned carbonyl group-containing polymer in an amount of 0.5 to 15 parts by weight per 100 parts by weight of said resinous composition, the flowability at the melt molding is generally improved by more than 10 %, and the melt molding processing can be facilitated greatly. Further, the surface of an article formed by melt molding such composition incorporated with the carbonyl group-containing polymer is smooth and uniform, and thus, the defect of the rough surface or craped appearance can be overcome.

The above effects of improving the processability and preventing occurrence of the rough surface or craped appearance are conspicuous when the hydroxyl group concentration in the saponified ethylene-vinyl acetate copolymer is relatively high, for instance, the saponified product has an ethylene content of 25 to 50 mole %.

The above improvement is owing to the characteristic properties of the carbonyl group-containing polymer, and it is difficult to improve the processability by incorporation of other polymers. For instance, as illustrated in comparative Examples given hereinbelow, incorporation of such polymers as polypropylene, polystyrene, polyisobutylene and styrene-butadiene copolymers into a resinous composition comprising a low density polyethylene and a saponified product of an ethylene-vinyl acetate copolymer hardly improves the meltmoldability of the composition in general.

An especially preferable amount incorporated of the carbonyl group-containing polymer varies considerably depending on the kind and carbonyl group concentration of the carbonyl group-containing polymer, and the hydroxyl group concentration and amount incorporated of the saponified ethylene-vinyl acetate copolymer.

In this invention, an especially preferable resinous composition consists essentially of:

A'. 30 to 98% by weight of a low density polyethylene having a density of 0.917 to 929 g/cc, B'. 2 to 70% by weight of a saponified product of an ethylene-vinyl acetate copolymer having an ethylene content of 25 to 50 mole % and a saponification degree of at least 99%, and C'. 3.0 to 15.0 parts by weight, per 100 parts by weight of the sum of (A') and (B'), of a carbonyl group-containing polymer having a carbonyl group concentration of 1.5 to 12.0 m.eq/g.

In the molded structure having the novel specific layer distribution according to this invention, it is important that the molded structure should be molded from a molten mixture comprising (A) the above-mentioned polyolefin and (B) the above-mentioned saponified ethylene-vinyl acetate copolymer at a weight ratio of A : B ranging from 95 : 5 to 75 : 25, especially from 95 : 5 to 80 : 20, and 0.5 to 15 parts by weight, per 100 parts by weight of the sum of (A) and (B), of a carbonyl group-containing polymer. In this embodiment of this invention, by maintaining the mixing ratio of the polyolefin (A) and the saponified ethylene-vinyl acetate copolymer (B) within the above-mentioned range, it is made possible to obtain a molded structure having a specific multi-layer structure in which the polymer composition is different in the thickness direction but substantially identical in the plane direction, and the layers are continuous with respect to the plane direction. For instance, when the ratio of the saponified ethylene-vinyl acetate copolymer in the molten mixture is less than 5% by weight or greater than 25% by weight, it is difficult to form definitely in the resulting molded structure (a) layers which contain predominantly the saponified ethylene-vinyl acetate copolymer, that is, layers which contain said saponified copolymer in an amount expressed by the formula $M_1 = m_1 X$ (in which $m_1$ is a number of from 1.2 to 4) and (b) layers which contain predominantly the polyolefin, that is, layers which contain the saponified copolymer in an amount expressed by the formula $M_2 = m_2 X$ (in which $m_2$ is a number of from 0 to 0.9). Further, in either of the above two cases, it is difficult to maintain both the permeability of oxygen and carbon dioxide gas and the permeability of water vapor coincidentally at desired levels.

The mixing of the polyolefin, saponified ethylene-vinyl acetate copolymer and carbonyl group-containing polymer may be accomplished by a method known per se, and any particular limitation is not imposed on the mixing method. Namely, it is sufficient to blend the polyolefin, saponified ethylene-vinyl acetate copolymer and carbonyl group-containing polymer in the powdery or granular state at room temperature by means of a mixer or the like prior to the melt molding operation, and an operation of mixing them in the molten state is not especially required. However, if desired, they are melt blended by means of a customary pelletizer or the like.

The resinous composition of this invention may further comprise other polymers, for instance, other poly-α-olefins, olerin copolymers, vinyl polymers, diolefin polymers and olefin-vinyl-type copolymers, in such amounts as will not give substantially any bad influences to the gas permeation resistance, impact resistance and transparency of the resulting composition, for instance, in amounts of up to 10.0 parts by weight per 100 parts by weight of the composition.

In the preparation of the resinous composition of this invention, when the final product is used as a packaging material for foodstuffs, it is preferable to conduct the preparation without use of so called additives. However, if desired, it is possible to incorporate known additives such as ultraviolet absorbents, stabilizers, lubricants, pigments and antistatic agents.

Molding Process

The resinous composition of this invention may be molded into optional molded articles such as films, sheets, tubes, bottles and tanks by a melt-molding method known per se, for instance, a method employing a melt-extruder. The melt extrusion temperature adopted during the molding operation differs depending on such factors as the properties of the extruder used, the molecular weights and mixing ratios of the resins, the ethylene content of the saponified copolymer, and the kind and molecular weight of the carbonyl group-containing thermoplastic polymer. In general, it is desired that the melt extrusion is conducted at a temperature ranging from 170° to 300°C. In the case of the resinous composition of this invention, the melt-extrusion molding can be accomplished very easily as compared with the case of a two-component composition comprising a polyolefin such as a low density polyethylene and a saponified product of ethylene-vinyl acetate copolymer, and a molded article prepared from the resinous composition is excellent in the surface smoothness and uniformity.

The novel molded structure of the specific layer distribution according to this invention can be usually formed by melting the above-mentioned resinous composition in the blended state, and extrusion molding the molten mixture (i) at a temperature of 170° to 250°C., (ii) under a pressure of 10 to 300 Kg/cm$^2$ and (iii) under such extrusion condition that the difference between the average flow rate ($\bar{v}_1$) of the melt of said polyolefin and the average flow rate ($\bar{v}_2$) of said ethylene-vinyl acetate copolymer saponified product is at least 1 cm/sec.

According to this preferable method of this invention, by conducting the molding so that the above three conditions (i), (ii) and (iii) will be satisfied, it is possible to form both layers (a) in which the saponified ethylene-vinyl acetate copolymer is predominantly contained and layers (b) in which the polyolefin is predominantly contained, in a flow of the resin melt coming out of the die head of the extruder.

In case the extrusion molding temperature is lower than 170°C., since the molding temperature approximates the melting point of the saponified ethylene-vinyl acetate copolymer, in the resulting molded product it is impossible to attain a layer structure in which layers are continuous with respect to the plane direction. Further, in case the extrusion molding temperature is higher than 250°C., the molten resin flows are intermingled too closely and it is difficult to obtain a molded product having the specific multi-layer structure specified in this invention, and degradation is caused by oxidation or thermal decomposition of the resins, especially the saponified ethylene-vinyl acetate copolymer.

At an extrusion molding pressure lower than 10 Kg/cm$^2$, it is difficult to attain the average flow rate difference of at least 1 cm/sec between the average flow rate ($\bar{v}_1$) of the polyolefin melt and the average flow rate ($\bar{v}_2$) of the saponified copolymer melt. On the other hand, at an extrusion molding pressure exceeding 300 Kg/cm$^2$, intermingling of the resin flows is brought about and it is difficult to form the specific multilayer structure in the resulting molding structure.

In this invention, it is especially important that the extrusion conditions are so selected that the value expressed by the following formula $$|\bar{v}_2 - \bar{v}_1| = \Delta \bar{v}$$

is at least 1 cm/sec, preferably 1 to 10 cm/sec. In the instant specification and claims, the average flow rate ($v$) is defined to be the value expressed by the following formula $$\bar{v} = (Q/3.6d)/\pi R^2$$

wherein Q stands for the amount (Kg/hr) of the resin melt extruded from the die of the extruder at prescribed temperature and pressure, d designates the density (g/cc) of the resin melt and R represents the radius (cm) of the die passage.

The density of the resin melt can be determined by calculating the amount extruded $\eta$ (cc) at prescribed pressure (e.g., 50 Kg/cm$^2$) and temperature by means of, for instance, a viscometer of the constant pressure extrusion type according to the following equation $$\eta = HA - \pi r^2 l$$

wherein H is the length (cm) of the lowering of the plunger, A is the cross-sectional area (cm$^2$) of the barrel, $r$ is the orifice radius (cm) and $l$ is the orifice length (cm), measuring the weight W (g) of $\eta$ cc of the extrudate, and conducting the calculation according to the following formula $$d = W/\eta \text{ (g/cc)}.$$

In this invention, conditions for adjusting the $\Delta v$ value to at least 1 cm/sec are attained, for instance, by the following prodedures:

1. With use of a melt extruder of the same structure and capacity, the degree of dependency of the average flow rate on temperature and pressure is determined with respect to each of the starting polyolefin and saponified copolymer, respectively, and the temperature and pressure conditions are decided so that the difference ($\Delta \bar{v}$) between the average flow rate ($\bar{v}_1$) of the polyolefin melt and the average flow rate ($\bar{v}_2$) of the saponified copolymer melt will be at least 1 cm/sec.

2. The structure or dimention of the extruder is changed or modified so that under prescribed temperature and pressure conditions the value $\Delta \bar{v}$ will be at least 1 cm/sec. For instance, since the radius of a passage for the resin melt in the die of the extruder gives a great influence to the flow rate of the resin melt, the condition of the value $\bar{v}$ being at least 1 cm/sec is attainable by adjusting the radius of the above passage within a suitable range.

3. It is possible to satisfy the condition of the $\Delta \bar{v}$ value being at least 1 cm/sec by combining the above procedures (1) and (2) appropriately.

In conducting the molding method of this invention, if under such conditions as will give the $\Delta \bar{v}$ value of less than 1 cm/sec, it is difficult to obtain a molded structure having the specific multi-layer structure specified in this invention. On the other hand, when the $\Delta \bar{v}$ value is too great, a good balance is not obtained between the flows of the molten polyolefin end of the molten saponified copolymer and hence, the molding tends to be difficult in some cases. In view of the foregoing, it is desired to select such conditions as will give the $\Delta \bar{v}$ value ranging from 1 to 10 cm/sec.

As far as the above condition is satisfied, any of known melt extruders may be optionally used in this invention. As such extruder there may be mentioned an extruder comprising a cylinder zone constructed of a passage equipped with a rotary screw and a resin-feeding opening connected with said passage; a die provided with a passage connected with said passage of the cylinder zone; and a die head provided with an extrusion opening attached to the end point of said die and connected with the die passage. It is important that care must be taken so that the resin melt formed in the cylinder zone of the extruder is allowed to move through passages of the die and die head in the form of a laminar flow. In other words, it is important that substantial mingling of molten resin flows is not caused to occur. Accordingly, it is preferred to employ as the screw a full-flighted screw such as a metering screw, but in the case of an ordinary screw generally called a mixing screw, such as a screw of the dulmage type, if it has five or less threads in the mixing zone, it is possible to obtain a molded structure having the specific multilayer structure specified in this invention by suitably choosing the extrusion conditions of such screw, for instance, the diameter of the screw or the radius R of the die passage. In order to increase the effect of kneading or mixing resins, or to prevent incorporation of foreign substances into a molded article, such members as a breaker plate and a screen are mounted at the die portion of the extruder in some cases in the art of the extrusion molding. In this invention, however, provision of such members on the die portion is not preferred because it prevents the molten resins from flowing in the laminar form. But if desired, it is permissible to use a breaker plate having less than 300 holes, or less than 5 screens of 120 mesh, and in such case, if the provision place of such breaker plate or screens, the radius R of the die passage, or other extrusion condition is suitably adjusted, it is possible to obtain a molded structure having the multi-layer structure specified in this invention. Furthermore, in case the $\Delta \bar{v}$ value is within the above-mentioned range but relatively small, by employing an extruder having a die passage of a relatively great length, it is made possible to manifest the above-mentioned specific layer structure more prominently and conspicuously in the resulting molded structure.

As the die head, any of a T-die head (or a slit die head) used for the ordinary film-forming method, a ring die head used for the inflation film-forming method, and a die head of the cross-head or spider type used for formation of containers by the blow molding may be used in this invention.

The mixing of a polyolefin, an ethylene-vinyl acetate copolymer saponified product and a carbonyl group-containing thermoplastic polymer may be carried out according to an optional method known per se, and the method for the primary mixing is not particularly critical in this invention. That is, it is sufficient to mix the polyolofin, the saponified copolymer and the carbonyl group-containing polymer in the powdery or granular state at room temperature merely by means of a mixer or the like prior to the melt molding, and any operation of mixing them in the molten state is not especially required. However, it is possible to employ a mixture which has once been melted and blended, such as flashes or fins formed during the molding operation.

The operational procedures for molding the composition of this invention into films, sheets, containers, tubes, pipes and the like are well known in the art except for the above-mentioned points. Therefor any special description is not given to these known procedures in the instant specification. These procedures for the molding operation are detailed in, for instance, the following literature references:

Keiji Oshima and Shoji Seto; "Methods of Molding and Processing Synthetic Resins" High Polymer Publishing Co., Inc., Kyoto (1956);

Keiji Sawada; "Extrusion Molding of Plastics and Its Application" Seibundo Shinkosha, Tokyo (1966);

David A. Jones and Thomas W. Mullen; "Blow Molding" Rheinhold, New York (1961); and Gerhard Schenkel; "Plastics Extrusion Technology and Theory" America Elsevier Publishing Co., Inc., New York (1966).

Structure of Molded Product

The molded product of this invention has, in general, a thickness of more than 60 $\mu$, especially from 150 $\mu$ to 6 mm, and is useful as a molded structure having two- or three-dimensional planes. Such molded structure includes films, sheets, embossed sheets, tubes, pipes and containers such as bags, bottles and tanks.

A preferable molded structure of this invention has a specific multi-layer structure characterized in that the polymer composition is different in the thickness direction but substantially identical in the plane direction and layers are continuous with respect to the plane direction. It has heretofore been known to obtain fibrillated fiber-like, tape-like or film-like molded articles by mixing two or more thermoplastic polymers having no compatibility with each other, melt extruding the mixture, cooling and solidifying the extrudate and drawing the solidified extrudate (see, for instance, Japanese Patent Publications No. 9651/60 and No. 5212/64). In molded articles obtained by these known methods, two or more thermoplastic polymers are present in the form of independent phases where the mingling of the polymers is not at all observed, and the peeling strength at the interfacial plane between the adjacent phases is substantially zero. Further, at least one of two or more of such phases tends to form a discontinuous, dispersed phase. Even if both phases are present in the continuous form, it is difficult to obtain a molded structure in which both phases are continuous with respect to the plane direction.

In contrast, according to a preferable embodiment of this invention, it is possible to obtain a molded structure having the above-mentioned specific multilayer structure by selecting (A) a polyolefin as one resin and (B) a saponified product of an ethylene-vinyl acetate copolymer as the other resin, mixing them at a weight ratio of A : B ranging from 95 : 5 to 75 : 25, incorporating therein a carbonyl group-containing thermoplastic polymer, and subjecting the mixture to the melt extrusion molding under the above-mentioned specific extrusion and molding conditions.

It can be confirmed by various experiments that a preferable molded structure of this invention is characterized in that the polymer composition is different in the thickness direction but substantially identical in the plane direction and each of the layers is continuous with respect to the plane direction.

For better illustration of this invention, description will now be made by reference to the accompanying drawings wherein.

FIG. 6 is a diagramatical graph illustrating the distribution of the saponified ethylene-vinyl acetate copolymer in the thickness direction in a molded structure of this invention; and FIGS. 7-A and 7-B are views illustrating the method for collecting samples in Examples of the instant specification, FIG. 7-A being a top view of samples to be collected (A, B, C and D), and FIG. 7-B being a view illustrating the cross-section of the sample to be divided into three layers 1, 2 and 3.

Figure 1:
FIG. 1 is an electron-microscopic photo showing the cross-section in the thickness direction of a molded structure of this invention.
Figure 2:
FIG. 2 is an electron-microscopic photo showing the cross-section in the plane direction of a molded structure of this invention.

When the cross-section in the thickness direction and plane direction of a preferable molded article of this invention is observed under an electron microscope, the presence of a layer structure extending continuously in the plane direction can readily be confirmed. FIGS. 1 and 2 are electron-microscopic photos showing the cross-sections in the thickness and plane directions of the body portion of a bottle prepared by the method described in Example 19 given hereinbelow. In FIG. 1, the upper "striped" portion is of the saponified ethylene-vinyl acetate copolymer and the "sealike" portion seen in the lower part of the photo is of the low density polyethylene. From the measurement of the infrared absorption spectrum, which will be described hereinbelow, it was confirmed that "insular" portions scattered throughout the layer structure are of the carbonyl group-containing thermoplastic polymer (ethylene-vinyl acetate copolymer in this embodiment). In FIG. 2, it is seen that in the plane direction the saponified ethylene-vinyl acetate copolymer is not present in the "striped" form but in the "plane-like" form (namely, in the continuous phase).

Electron-microscopic photos were taken by the following method:

i. The sample was cut in a prescribed size in either the thickness or plane direction by means of a diamond knife.

ii. A small amount of gold was vacuum-plated on each cut face (i. e., face to be observed).

iii. Each face to be observed was enlarged by a scanning electron microscope and photographed.

The magnification was 100 in FIG. 1 and 300 in FIG. 2.

In FIG. 1, the vertical direction in the photo is the thickness direction of the body portion of the bottle (the upper part corresponds to the outer side of the bottle and the lower part corresponds to the inner side of the bottle), and the horizontal direction in the photo is the direction vertical to the resin flow direction. In FIG. 2 the vertical direction in the photo is the direction parallel to the resin flow direction and the horizontal direction in the photo is the direction vertical to the resin flow direction.

Figure 3:
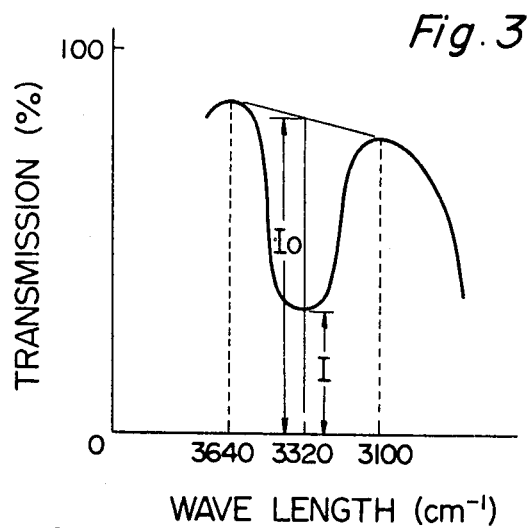
FIG. 3 is a curve illustrating the method for determining Io and I values at a wavelength of 3320 cm$^{-1}$ from the infrared absorption spectrum.
Figure 4:
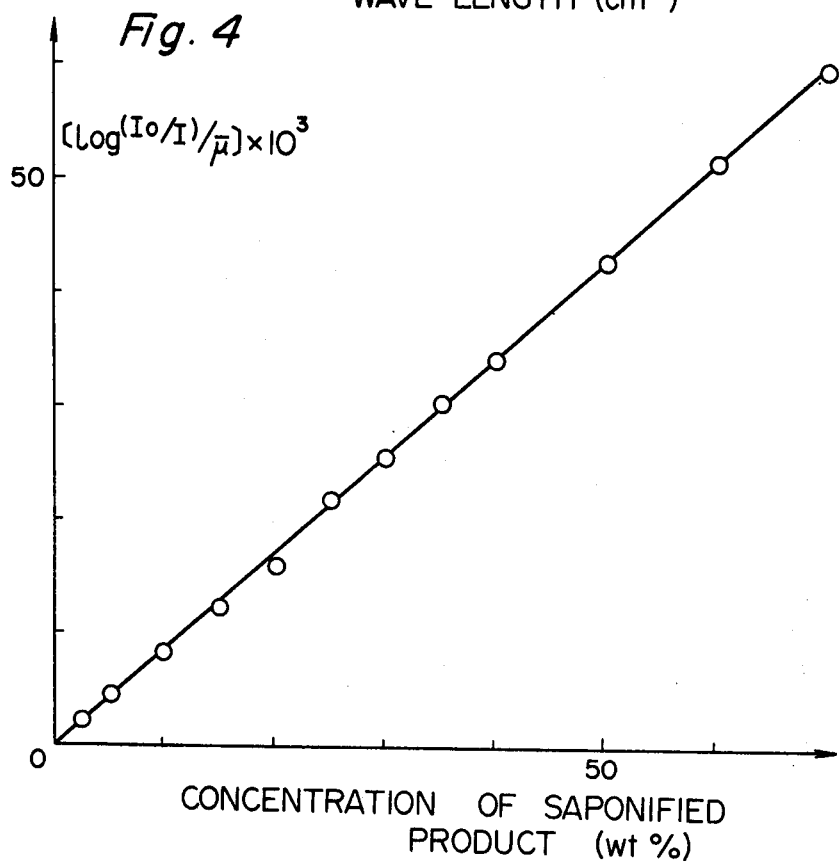
FIG. 4 is a graph illustrating one example of the calibration curve for calculating the concentration of the saponified ethylene-vinyl acetate copolymer present in each layer of a molded structure of this invention.
Figure 5:
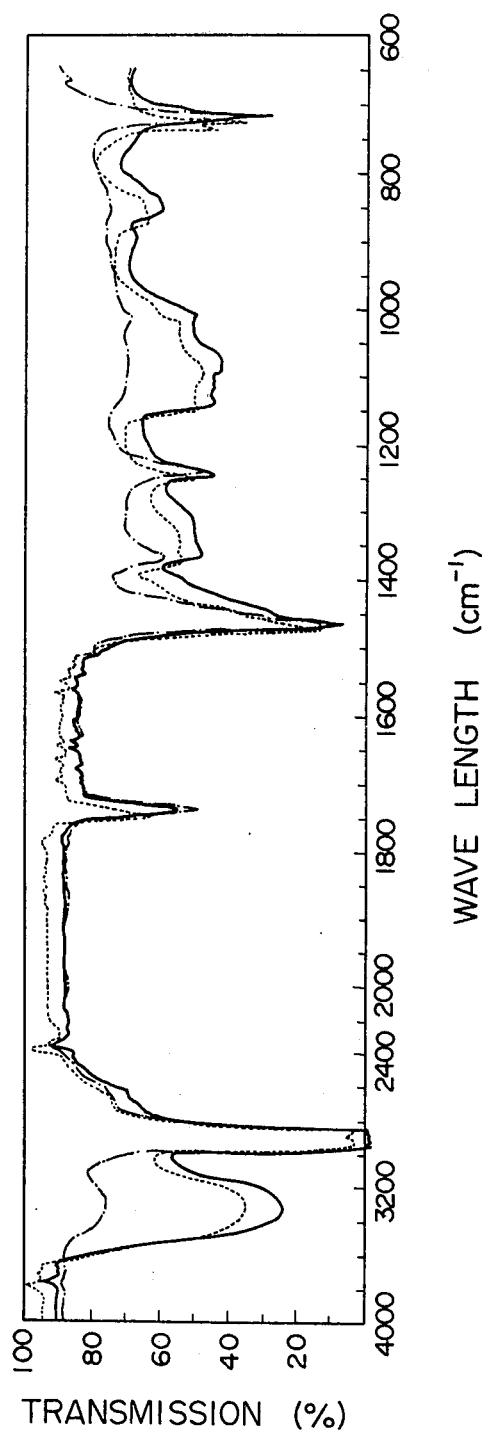
FIG. 5 is a graph illustrating the infrared absorption spectrum of each layer of a molded structure of this invention.

The fact that in the molded structure the resins are distributed so that the polymer composition is different in the thickness direction can be confirmed by taking out an optional layer from the molded structure by mechanical peeling means or the like and examining the infrared absorption spectrum of the sample. For instance, the saponified ethylene-vinyl acetate copolymer exhibits an absorption at 3320 cm$^{-1}$ owing to the presence of the hydroxyl group, and therefore, the concentration of the saponified copolymer present in an optional layer of the molded structure can be determined by the following method:

i. One polyolefin (A) and a saponified product of an ethylene-vinyl acetate copolymer (B) whose ethylene content and degree of saponification were known were preliminarily blended (dry-blended) at a weight ratio of A : B ranging from 97.5 : 2.5 to 30 : 70, and then, the melt blending was conducted at 220°C. in a nitrogen atmosphere for 15 minutes with use of a Banbury mixer (the rotation rate of the rotor being 45 rpm). As a result of the microscopic observation, it was confirmed that in all of the mixtures obtained under such conditions the components A and B were mixed homogeneously.

ii. Each of the so formed mixture was heated at 195°C. under a pressure of 10 Kg/cm$^2$ to 300 Kg/cm$^2$ for 2 minutes by employing a high pressure press and formed into a film having a thickness of 5 to 150 $\mu$.

iii. The infrared absorption curve of each of the so formed films was obtained under conditions of a temperature of 20°C. and a relative humidity of 40 % by means of an infrared spectrophotometer.

iv. In each infrared absorption curve thus obtained, the point at 3100 cm$^{-1}$ was connected with the point at 3640 cm$^{-1}$ by a line as diagramatically illustrated in FIG. 3. As illustrated in FIG. 3, the values of Io and I were read from the crossing point of said line and the line vertical to the wavelength axis at 3320 cm$^{-1}$ and from the crossing point of said vertical line and the absorption curve, respectively.

v. According to the following known equation $$\frac{\log(Io/I)}{\mu} = KC$$

wherein $\mu$ is the average thickness ($\mu$) of the film used for the infrared absorption measurement, C designates the concentration (% by weight) of the saponified ethylene-vinyl acetate copolymer, and K is a constant, the values of $(\log(Io/I))/\mu$ and C were plotted to obtain the calibration curve. FIG. 4 illustrates an instance of such calibration curve obtained in the mixture system of a low density polyethylene (1A) having a density of 0.920 g/cc (determined according to ASTM D–1505) and a saponified product of an ethylene-vinyl acetate copolymer (1B) having an ethylene content of 25.4 mole % and a degree of saponification of 99.2 %. From FIG. 4, the calibration curve expressed by the formula $$\frac{\log(Io/I)}{\mu} = (0.85 \times 10^{-3})C$$

was obtained with respect to the mixture system of above components 1A and 1B. In the same manner as described above, the calibration curve expressed by the formula $$\frac{\log (Io/I)}{\bar{\mu}} = (0.85 \times 10^{-3})C$$

was obtained with respect to the mixture system of a high density polyethylene (2A) having a density of 0.945 g/cc (determined according to ASTM D–1505) and said saponified copolymer (1B). Similarly, the calibration curve expressed by the formula $$\frac{\log (Io/I)}{\bar{\mu}} = (0.85 \times 10^{-3})C$$

was obtained with respect to the mixture system of an isotactic polypropylene (3A) having a density of 0.914 g/cc (determined according to ASTM–1505) and said saponified copolymer (1B). Similarly the calibration curve expressed by the formula $$\frac{\log (Io/I)}{\bar{\mu}} = (0.70 \times 10^{-3})C$$

was obtained with respect to the mixture system of said low density polyethylene (1A) and a saponified ethylene-vinyl acetate copolymer (2B) having an ethylene content of 30.5 mole % and a degree of saponification of 98.1 %. Still further, the calibration curve expressed by the formula $$\frac{\log (Io/I)}{\bar{\mu}} = (0.42 \times 10^{-3})C$$

was obtained with respect to the mixture system of the low density polyethylene (1A) and a saponified ethylene-vinyl acetate copolymer (3B) having an ethylene content of 49.4 mole % and a degree of saponification of 96.3 %. As the carbonyl group-containing thermoplastic polymer, there were chosen Surlyn A of the $Na^+$ type having a carboxylic acid concentration of 5 mole %, Suryln A of the $Zn^{++}$ type having a carboxylic acid concentration of 10 mole %, an ethylene-vinyl acetate copolymer having a vinyl acetate concentration of 10 % by weight and an ethylene-ethyl acrylate copolymer having an ethyl acrylate concentration of 18 % by weight, and these polymers were molded into films in the same manner as described in (ii) above. Then, their infrared absorption spectrum curves were obtained in the same manner as described in (iii) above but in any of them there was not observed any absorption at 3320 $cm^{-1}$.

vi. Parts, detailed in Examples given hereinbelow, of a molded article obtained according to the method of this invention were divided into three layers in the thickness direction according to the sampling method described hereinbelow, and each layer was molded into a film by the method described in (ii) above.

vii. The infrared absorption curve of each layer obtained in (vi) above was obtained under the same conditions with use of the same apparatus as in (iii) above. In FIG. 5 are illustrated infrared absorption curves of the layers obtained by dividing the body portion of a bottle prepared by the method detailed in Example 19 given hereinbelow, into three layers in the thickness direction. In FIG. 5 the solid line indicates the infrared absorption curve of the first layer, the dotted line indicates that of the second layer and the chain line indicates that of the third layer.

viii. With respect to each of the so obtained infrared absorption curves, the values Io and I were determined from the absorption at 3320 $cm^{-1}$ in the same manner as in iv) above, and from these Io and I values and the average thickness ($\bar{\mu}$) of each film, the value of (log (Io/I) )/$\bar{\mu}$ was calculated. The calculated value was put into the calibration curve equation of the corresponding mixture system described in (v) above, and the concentration of the saponified ethylene-vinyl acetate copolymer was calculated.

When a molded structure of this invention is divided into three layers in the thickness direction, (a) at least one layer contains the saponified ethylene-vinyl acetate copolymer in an amount greater than the average content (X), namely in an amount expressed by the formula $$M_1 = m_1 X$$

(in which $m_1$ is a number ranging from 1.2 to 4), and (b) at least one layer contains the saponified copolymer in an amount less than the average content (X), namely in an amount expressed by the formula $$M_2 = m_2 X$$

(in which $m_2$ is a number ranging from 0 to 0.9).

The layer (a) in which the saponified ethylene-vinyl acetate copolymer is predominantly distributed may be present in either one or both of the surface layers of the molded structure, or in the form of an intermediate layer. FIG. 6 is a view illustrating diagramatically the distribution in the thickness direction of the saponified ethylene-vinyl acetate copolymer in a molded structure of this invention, wherein the oridinate indicates the ratio of the content of the saponified copolymer at an optional point in the thickness direction to the average content of the saponified copolymer, and the abscissa indicates the dimension in the thickness direction of the molded structure. The curve A is of a molded structure in which the saponified copolymer is predominantly distributed in both surface layers, the curve B is of a molded structure in which the saponified copolymer is predominantly distributed in the intermediate layer, and the curves C and D are of molded structures in which the saponified copolymer is predominantly distributed in either of the surface layers.

Such four types of the distribution of the saponified ethylene-vinyl acetate copolymer may be formed, for instance, by choosing and combining appropriately the average flow rate of the polyolefin melt, the average rate of the melt of the ethylene-vinyl acetate copolymer saponified product and the conditions of the melt extrusion of the resinous composition.

For instance, when the combination of both resins or extrusion conditions are so chosen that the average flow rate of the polyolefin melt is higher than the average flow rate of the saponified copolymer melt, and when the molding is conducted with use of a die head in which the melt is not divided, such as slit die head, the resulting sheet or film in characterized by the saponified copolymer distribution in the thickness direction such as shown by curve A in FIG. 6. A sheet or film molded under such extrusion conditions or with such combination of both resins that the average flow rate of the polyolefin melt is lower than that of the saponified copolymer melt, with use of a die head in which the melt is not divided, such as a slit die head, is characterized by the saponified copolymer distribution in the thickness direction such as shown by curve B in FIG. 6. Under such extrusion conditions or with such combination of both resins that the saponified copolymer distribution of curve A or B is obtained as a mentioned above, if a pipe, tube, bottle, tank or film is molded with use of a die head in which the melt is divided, such as a spider type die head, the resulting molded structure exhibits such a curve of the saponified copolymer content as curve C or D in FIG. 6. Even when there is used a die head in which the melt is divided, such as a spider type die head, a molded pipe, tube, bottle, tank or film whose curve of the saponified copolymer distribution in the thickness direction is such as curve A or B can be obtained by making the die land portion of such die longer.

A preferable molded structure of this invention can clearly be distinguished from a blend of a polyolefin and an ethylene-vinyl acetate copolymer saponified and a laminated structure formed from a polyolefin and an ethylene-vinyl acetate copolymer saponified product. In a molded structure obtained by laminating a layer of a polyolefin and a layer of a saponified ethylene-vinyl acetate copolymer, since there is no bondability between two resins, it is necessary to bond both the layers with an aid of an especial adhesive. Such laminated structure may be excellent in the gas permeation resistance, but defects are brought about with respect to the peel strength, heat resistance, water resistance, hot water resistance, impact resistance and other properties. A molded structure composed of a homogeneous blend of a polyolefin and a saponified product of an ethylene-vinyl acetate copolymer tends to exhibit values of the oxygen permeation resistance, carbon dioxide gas permeation resistance and water vapor permeation resistance, each of which approximates the arithmetic mean of the values of a molded structure of the polyolefin alone and of a molded structure of the saponified copolymer alone.

In contrast, in a preferable molded structure of this invention, a layer of a low permeability of a gas such as oxygen or carbon dioxide gas in which a saponified ethylene-vinyl acetate copolymer is predominantly distributed and a layer of a high water vapor permeation resistance in which a polyolefin is predominantly distributed are tightly and integrally bonded without any interfacial adhesive layer. By dint of this structural characteristics, the preferable molded article of this invention can possess a permeation resistance against oxygen, carbon dioxide gas and water vapor, which is almost comparable to that of a laminated structure of a polyolefin and a saponified ethylene-vinyl acetate copolymer, and mechanical properties such as peel strength and impact resistance, almost comparable to those of a molded structure of a blend of a polyolefin and a saponified ethylene-vinyl acetate copolymer.

Thus, the molded structure of this invention in the form of a film or a film laminated with a film of other synthetic resin or a metal foil is useful as a film container for preserving foodstuffs, medicines, etc. for a long period of time, and when molded in the form of a tube, bag, bottle or tank, the molded structure of this invention is useful as a vessel or container for preserving foodstuffs, medicines, etc.

This invention will now be illustrated in more detail by reference to Examples.

In each of Examples 14 to 27, each of sample layers was collected by the following sampling method.

i. A disc of a diameter of 7.0 cm was taken from a prescribed portion (indicated in each Example) of the molded article, and the oxygen permeability was determined.

ii. The disc-like sample after the oxygen permeability test was dried in vacuo at 50°C.

iii. The dried disc-like sample was cut into four rectangular parallelopipeds A, B, C and D as illustrated in FIG. 7-A.

iv. Each of the four samples was divided into 3 layers in the thickness direction (i.e., the direction parallel to the plane) (see FIG. 7-B).

The three layers were designated as follows:

a. In case the molded article was sheet:
layer 1 — surface portion closely contacted with a take-up roll
layer 2 — intermediate portion
layer 3 — surface portion not contacted with a take-up roll b. In case the molded article was a film bottle or pipe formed by inflation molding:
layer 1 — portion corresponding to the outer portion of form of the molded article before cutting (outside portion of the cylindrical form)
layer 2 — intermediate portion
layer 3 — portion corresponding to the inner portion of the form of the molded article before cutting (inside portion of the cylindrical form)

Accordingly, when the values of the saponified ethylenevinyl acetate copolymer concentration (content) given with respect to layers 1, 2 and 3 of the same alphabetic letter (one of A, B, C and D) are compared in Tables given in Examples, it is possible to know the concentration difference in the thickness direction of the molded article. Further, when the values of the saponified copolymer concentration (content) given with respect to samples A, B, C and D of the same numerical figure (one of 1, 2 and 3) are compared, it is possible to know the concentration difference in the plane direction of the molded article.

Abbreviations used in Tables of Examples have the following meaning:

$d$; density (g/cc) (determined according to ASTM D-1505) of polyolefin $Et$; ethylene content (mole %) of saponified ethylene-vinyl acetate copolymer PO/EV; mixing ratio (weight ratio) of polyolefin (X) to saponified ethylenevinyl acetate copolymer (V)

C; amount added (parts by weight) of carbonyl group-containing polymer

Out-put; amount extruded from extruder (g/min)

$QO_2$; oxygen permeability (cc/m$^2$.day.atm.200 $\mu$)

$QCO_2$; carbon dioxide gas permeability (cc/m$^2$. day..atm.200 $\mu$)

$QH_2O$; water vapor permeability (g/m$^2$.day.50 $\mu$)

E; tensile elasticity (Young's modulus) (Kg/cm$^2$)

Sf; tensile strength at breakage (Kg/cm$^2$)
ef; tensile distortion at breakage (%)
HAZE; haze value (%)
Nf; frequency of breakage (times) (the frequency of the falling test until the first bottle is broken when 20 bottles are subjected to the falling test 50 times)

EXAMPLE 1

100 Parts by weight of a composition consisting of a mixture composed of a low density polyethylene having a melt index of 0.34 (measured according to ASTM D–1238; the same shall apply hereinafter) and a density of 0.928 (measured according to ASTM D–1505; the same shall apply hereinafter) and a saponified product of an ethylene-vinyl acetate copolymer having an ethylene content of 25 mole % and a degree of saponification of 93 %, at a mixing weight ratio of 30 : 70, was incorporated with 15 parts by weight of either of the following polymers as a carbonyl group-containing thermoplastic polymer (C); (a) a polyvinyl acetate obtained by the bulk polymerization, having an intrinsic viscosity, measured at 30°C. in acetone solution, of 1.53 d l/g and a carbonyl concentration of 11.6 milliequivalents per gram of the polymer, (b) 6 nylon having a relative viscosity in sulfuric acid solution of 3.4 (concentration = 10.0 g/l; temperature 20°C.) and a carbonyl concentration of 8.9 milliequivalents per gram of the polymer, (c) Surlyn A (trademark for product of Du Pont) (ionomer of the zinc type) having a melt index of 0.7, a density of 0.960 and a carbonyl content of 1.6 milliequivalents per gram of the polymer, (d) an ethylene-vinyl acetate copolymer having an ethylene content of 83 mole %, a melt index of 2.4 and a carbonyl concentration of 4.5 milliequivalents per gram of the polymer, (e) an acrylic acid-grafted polyethylene having an acrylic acid-grafting ratio of 8.2 %, a melt index of 0.9 and a carbonyl concentration of 2.5 milliequivalents per gram of the polymer and (f) an ethylene-ethyl acrylate copolymer having an ethylene content of 89 mole %, a melt index of 6.2 and a carbonyl concentration of 3.1 milliequivalents per gram of the polymer. The resulting composition was dry-blended at room temperature and molded into a film having a thickness of about 200 $\mu$ by employing an extruder equipped with a nylon type screw having a diameter of 25 mm and a length of 625 mm (screw rotation rate = 65 rpm; die temperature = 250°C.) and a T-die.

For comparison, films were molded under the same extrusion molding conditions with use of the same extrusion molding machine as described above, from the above-mentioned low density polyethylene; the above-mentioned saponified ethylene-vinyl acetate copolymer; a 30 : 70 (weight ratio) two-component mixture of the above-mentioned low density polyethylene and saponified ethylene-vinyl acetate copolymer; a composition consisting of 100 parts by weight of a 30 : 70 (weight ratio) mixture of the above-mentioned low density polyethylene and saponified ethylene-vinyl acetate copolymer and 15 parts by weight of an isotactic polypropylene having a melt index of 1.0; a composition consisting of 100 parts of a 30 : 70 (weight ratio) mixture of the above-mentioned low density polyethylene and saponified ethylene-vinyl acetate copolymer and 15 parts by weight of a polyisobutylene having a viscosity average molecular weight of 1,000,000 (calculated from the intrinsic viscosity measured at 35°C. in tetrahydrofuran solution); a composition consisting of 100 parts by weight of a 70 : 30 (weight ratio) mixture of the above-mentioned low density polyethylene and saponified ethylene-vinyl acetate copolymer and 15 parts by weight of an atactic polystyrene having a melt index of 3.5; and a composition consisting of 100 parts by weight of a 70 : 30 (weight ratio) mixture of the above-mentioned low density polyethylene and saponified ethylene-vinyl acetate copolymer and 15 parts by weight of a styrene-butadiene copolymer having a styrene content of 80 mole %.

At the extrusion molding operation, the amount extruded from the extruder, out-put (g/min), was measured with respect to each sample.

With respect to each of the above-mentioned 13 films, the oxygen permeability, $QO_2$ (cc/m$^2$.day.atm.200$\mu$), was determined at a temperature of 27°C. and a relative humidity of 90 % by employing a gas permeability tester. Further, with use of a tensile tester, the tensile elasticity in the stretch direction, E (Kg/cm$^2$), the tensile strength in the stretch direction at breakage, Sf (Kg/cm$^2$), and the tensile elongation in the stretch direction at breakage, ef (%), were measured at a temperature of 20°C., a relative humidity of 65 % and a stretch rate of 300 mm/min. The appearance of each film was evaluated based on the visual observation made by 25 men. The evaluation score of the appearance of the film from the saponified ethylene-vinyl acetate copolymer having the best appearance and the evaluation score of the appearance of the film from the abovementioned two-component mixture having the worst appearance were precribed as +6 and 0, respectively. The appearance of each of other films was compared with those of these standard films and the relative score of the film was determined by each of 25 men. The appearance score was an average of the scores determined by 25 men.

Each of the films was pressed under a pressure of 150 Kg/cm$^2$ at 250°C. for 10 minutes by means of a high pressure press to form a thin film having a thickness of 50 ± 3 $\mu$, and with respect to the so formed thin film, the water vapor permeability, $QH_2O$ (g/m.day.atm.50 $\mu$) was determined according to the method JIS Z-0208, and the haze value, HAZE (%) was measured by employing a haze tester at a temperature of 20°C. and a relative humidity of 65 %.

The amount extruded (out-put), oxygen permeability ($QO_2$), water vapor permeability ($QH_2O$), tensile elasticity (E), tensile strength at breakage (S$f$), tensile elongation at breakage (ef), haze value (HAZE) and appearance condition (appearance) of each film are shown in Table 1.

From the data shown in Table 1, the following matters can be seen:

Compositions formed by incorporating into the two-component mixture of the low density polyethylene and saponified ethylene-vinyl acetate copolymer, as a carbonyl group-containing thermoplastic polymer (C), polyvinyl acetate (PVAC in Table 1), 6-nylon (6-Nylon in Table 1), Surlyn A (trademark) (Surlyn-A in Table 1), ethylene-vinyl acetate copolymer (EVA in Table 1), acrylic acid-grafted polyethylene (AG-PE in Table 1) or ethylene-ethyl acrylate copolymer (EEA in Table 1) were comparable to the above-mentioned two-component mixture with respect to the oxygen permeability, water vapor permeability, tensile elasticity and haze value, and in films of these compositions the amount extruded and tensile elongation at breakage were improved over the film of the two-component mixture. Further, the appearance of each of films formed from these compositions was improved and was almost comparable to that of the film formed from the saponified ethylene-vinyl acetate copolymer. In compositions obtained by incorporating as a third component (C) polypropylene (PP in Table 1), polyisobutylene (PIB in Table 1), polystyrene (PS in Table 1) or styrene-butadiene copolymer (SBR), such improvements as mentioned above were hardly observed.

The amount extruded, out-put (g/min), of each composition, and the oxygen permeability, $QO_2$ (cc/$m^2$·day·atm·200 $\mu$), water vapor permeability, $QH_2O$ (g/$m^2$·day·50 $\mu$), carbon dioxide gas permeability, $QCO_2$ (cc/$m^2$·day·atm·200 $\mu$), tensile elasticity, E (Kg/$cm^2$), tensile strength at breakage, $Sf$ (Kg/$cm^2$), tensile elongation at breakage, $ef$ (%), haze value, HAZE (%), and appearance condition, appearance Table 1

| LDPE/EV | Polymer C Amount (parts by weight) | Kind | Output | $QO_2$ | $QH_2O$ | E | Sf | ef | HAZE | Appearance |
|---|---|---|---|---|---|---|---|---|---|---|
| 100/0 | 0 | — | 58.1 | 1100 | 10.8 | 9500 | 185 | 1050 | 32.1 | +5.0 |
| 30/70 | 0 | — | 66.9 | 10.4 | 45.1 | 14900 | 195 | 850 | 28.0 | 0 |
| 30/70 | 15 | PP | 62.7 | 14.6 | 42.9 | 15500 | 196 | 300 | 25.3 | +0.7 |
| 30/70 | 15 | PIB | 59.4 | 17.2 | 47.0 | 14600 | 205 | 750 | 23.9 | +1.6 |
| 30/70 | 15 | PS | 58.0 | 27.6 | 52.4 | 16300 | 140 | 80 | 79.2 | −0.4 |
| 30/70 | 15 | SBR | 59.6 | 26.5 | 50.6 | 15100 | 162 | 250 | 70.5 | +0.1 |
| 30/70 | 15 | PV Ac | 80.3 | 10.7 | 46.0 | 14500 | 210 | 800 | 24.0 | +3.3 |
| 30/70 | 15 | 6 Nylon | 81.5 | 10.1 | 44.6 | 14600 | 216 | 800 | 23.1 | +4.0 |
| 30/70 | 15 | Surlyn A | 82.6 | 10.2 | 45.0 | 14000 | 213 | 800 | 23.2 | +4.5 |
| 30/70 | 15 | EVA | 84.5 | 10.6 | 45.3 | 14500 | 212 | 850 | 22.6 | +4.7 |
| 30/70 | 15 | AG·PE | 85.0 | 10.4 | 46.0 | 14900 | 215 | 800 | 25.0 | +3.6 |
| 30/70 | 15 | EEA | 84.3 | 10.8 | 44.2 | 14300 | 211 | 850 | 24.6 | +4.4 |
| 0/100 | 0 | — | 87.7 | 5.6 | 145 | 19500 | 300 | 200 | 21.5 | +5 |

EXAMPLE 2

A low density polyethylene having a melt index of 2.1 and a density of 0.917 was blended with a saponified product of an ethylene-vinyl acetate copolymer having an ethylene content of 25 mole % and a degree of saponification of 93 % at a mixing weight ratio indicated in Table 2, and 100 parts by weight of the resulting composition was incorporated with 0 – 25.0 parts by weight of 6-nylon having a carbonyl group concentration of 8.9 milliequivalents per gram of the polymer and a relative viscosity, measured in 98 % sulfuric acid containing the polymer at a concentration of 10.0 g/l at 20°C., of 3.4. Then, the composition was dry-blended at room temperature. Thirty films indicated in Table 2 were molded from compositions obtained in the above manner under the same extrusion conditions with use of the same extrusion molding apparatus as described in Example 1. Each film had a thickness of about 200 $\mu$.

(point), of each film were measured. The carbon dioxide gas permeability was determined at a temperature of 27°C. and a relative humidity of 90 % with use of a gas permeability tester. Other properties were determined under the same measuring conditions according to the same measuring methods as in Example 1. Results are shown in Table 2.

From the results shown in Table 2, it can readily be understood that at the mixing ratios of the low density polyethylene and saponified ethylene-vinyl acetate copolymers ranging from 98 : 2 to 30 : 70 and at the amounts added of the nylon-6 ranging from 0.1 to 15.0 parts, the amount extruded of the composition, and the tensile elongation at breakage and appearance condition of the resulting film can be highly improved as compared with the case of the two-component system composition (the amount added of the nylon-6 being zero) without substantial degradation of such properties as oxygen permeability, carbon dioxide gas permeability, water vapor permeability, tensile elasticity and haze value.

Table 2

| LDPE/EV | C | Output | $QO_2$ | $QCO_2$ | $QH_2O$ | E | Sf | ef | HAZE | Appearance |
|---|---|---|---|---|---|---|---|---|---|---|
| 100/0 | 0 | 65.7 | 1600 | 19000 | 14.0 | 8000 | 133 | 2200 | 20.0 | +5.0 |
| 100/0 | 0.1 | 65.6 | 1600 | 18500 | 13.3 | 8100 | 133 | 2200 | 20.1 | +4.2 |
| 100/0 | 5.0 | 65.9 | 1430 | 14000 | 14.0 | 8100 | 135 | 2100 | 20.0 | +4.0 |
| 100/0 | 15.0 | 66.5 | 720 | 12100 | 14.2 | 8400 | 137 | 2000 | 19.6 | +3.6 |
| 100/0 | 25.0 | 68.1 | 495 | 11600 | 14.6 | 14300 | 146 | 1700 | 19.4 | +3.5 |
| 98/2 | 0 | 65.8 | 890 | 5820 | 14.7 | 8100 | 135 | 2000 | 20.0 | 0 |
| 98/2 | 0.1 | 66.9 | 879 | 5770 | 14.5 | 8100 | 135 | 2000 | 20.0 | +2.6 |
| 98/2 | 5.0 | 67.4 | 652 | 5110 | 14.7 | 8200 | 134 | 1950 | 20.0 | +3.9 |
| 98/2 | 15.0 | 74.5 | 376 | 4910 | 14.8 | 8300 | 136 | 1900 | 19.7 | +3.7 |
| 98/2 | 25.0 | 76.0 | 261 | 4570 | 15.5 | 15000 | 145 | 1600 | 19.3 | +3.5 |
| 55/45 | 0 | 66.3 | 22.7 | 109 | 23.9 | 8900 | 137 | 1700 | 21.0 | 0 |
| 55/45 | 0.1 | 68.7 | 22.1 | 106 | 20.7 | 8700 | 135 | 1700 | 21.0 | +2.0 |
| 55/45 | 5.0 | 74.9 | 20.2 | 104 | 21.6 | 8900 | 138 | 1600 | 20.7 | +4.0 |
| 55/45 | 15.0 | 86.1 | 20.3 | 107 | 22.0 | 9100 | 140 | 1600 | 20.5 | +3.8 |
| 55/45 | 25.0 | 87.0 | 24.5 | 113 | 35.5 | 16700 | 149 | 1200 | 20.1 | +3.6 |
| 30/70 | 0 | 71.8 | 10.3 | 37.1 | 45.0 | 14200 | 190 | 500 | 21.5 | 0 |
| 30/70 | 0.1 | 73.7 | 10.2 | 36.5 | 44.0 | 14000 | 190 | 650 | 21.4 | +2.1 |
| 30/70 | 5.0 | 80.1 | 9.7 | 36.6 | 40.2 | 13900 | 196 | 1450 | 20.9 | +3.9 |
| 30/70 | 15.0 | 87.4 | 10.0 | 37.0 | 44.9 | 14300 | 198 | 1600 | 20.6 | +4.0 |
| 30/70 | 25.0 | 88.0 | 13.1 | 42.4 | 70.6 | 17200 | 198 | 1200 | 20.3 | +3.3 |
| 20/80 | 0 | 76.2 | 8.0 | 27.6 | 63.1 | 16800 | 223 | 250 | 21.5 | 0 |
| 20/80 | 0.1 | 78.8 | 8.0 | 28.0 | 65.1 | 15100 | 225 | 300 | 21.5 | +2.1 |
| 20/80 | 5.0 | 82.3 | 8.4 | 28.7 | 70.2 | 16000 | 230 | 500 | 21.1 | +3.9 |
| 20/80 | 15.0 | 88.2 | 8.9 | 29.6 | 79.5 | 16900 | 235 | 550 | 20.8 | +4.0 |
| 20/80 | 25.0 | 88.6 | 10.6 | 32.5 | 96.0 | 18000 | 235 | 300 | 20.5 | +3.8 |

Table 2-continued

| LDPE/EV | C | Output | $QO_2$ | $QCO_2$ | $QH_2O$ | E | Sf | $\epsilon f$ | HAZE | Appearance |
|---|---|---|---|---|---|---|---|---|---|---|
| 0/100 | 0 | 87.7 | 5.6 | 18.2 | 145 | 19500 | 300 | 200 | 21.5 | +5 |
| 0/100 | 0.1 | 87.8 | 5.9 | 19.6 | 145 | 19400 | 300 | 200 | 20.8 | +4.9 |
| 0/100 | 5.0 | 88.0 | 7.1 | 20.2 | 159 | 19200 | 302 | 250 | 20.4 | +4.7 |
| 0/100 | 15.0 | 88.6 | 9.8 | 24.8 | 188 | 19000 | 301 | 250 | 20.2 | +4.5 |
| 0/100 | 25.0 | 88.9 | 11.5 | 30.9 | 202 | 19000 | 305 | 200 | 20.0 | +4.8 |

EXAMPLE 3

A low density polyethylene having a melt index of 2.1 and a density of 0.917 was mixed with a saponified product of an ethylene-vinyl acetate copolymer having an ethylene content of 75 mole % and a degree of saponification of 93 at a weight ratio indicated in Table 3. Then, 100 parts by weight of the mixture was incorporated with 0 to 25.0 parts by weight of Surlyn A (trademark; ionomer of the Zn ion type manufactured by Du Pont, U.S.A. and having a melt index of 0.7 and a density of 0.960) having a carbonyl group concentration of 1.6 milliequivalents per gram of the polymer, and the composition was dry-blended at room temperature. Thirty films indicated in Table 3 were molded from compositions formed in a manner as described above under the same extrusion conditions with use of the same extrusion-molding apparatus as described in Example 1. Each film had a thickness of about 200 μ. Properties as mentioned in Example 2 were determined under the same measuring conditions according to the same measuring methods as in Example 2. Results are shown in Table 3.

From the results shown in Table 3, it can readily be understood that at the mixing ratios of the above-mentioned low density polyethylene and saponified ethylene-vinyl acetate copolymer ranging from 98 : 2 to 30 : 70 and at the amounts added of the above-mentioned Surlyn A (trademark) ranging from 0.1 to 15.0 parts by weight, the amount extruded of the composition and the tensile elongation at breakage and appearance condition of the resulting film can be highly improved as compared with the case of the two-component system composition (the amount added of Surlyn A (trademark) being zero) without substantial degradation of properties such as oxygen permeability, carbon dioxide gas permeability, water vapor permeability, tensile elasticity and haze value.

Table 3

| LDPE/EV | C | Output | $QO_2$ | $QCO_2$ | $QH_2O$ | E | Sf | $\epsilon f$ | HAZE | Appearance |
|---|---|---|---|---|---|---|---|---|---|---|
| 100/0 | 0 | 65.7 | 1600 | 19000 | 14.0 | 8000 | 133 | 2200 | 20.0 | +5.0 |
| 100/0 | 0.1 | 65.7 | 1600 | 19000 | 14.2 | 8000 | 133 | 2150 | 20.1 | +4.7 |
| 100/0 | 5.0 | 65.4 | 1600 | 19000 | 14.1 | 8100 | 132 | 2200 | 19.8 | +4.7 |
| 100/0 | 15.0 | 65.0 | 1650 | 19500 | 14.4 | 8100 | 134 | 2200 | 19.7 | +4.6 |
| 100/0 | 25.0 | 64.7 | 1750 | 21000 | 16.7 | — | — | — | 19.7 | +4.5 |
| 98/2 | 0 | 65.7 | 1400 | 16500 | 14.6 | 8000 | 132 | 2100 | 20.5 | 0 |
| 98/2 | 0.1 | 67.0 | 1400 | 16500 | 14.6 | 7900 | 138 | 2150 | 20.4 | +4.7 |
| 98/2 | 5.0 | 68.2 | 1400 | 16000 | 14.7 | 8000 | 133 | 2100 | 20.1 | +4.5 |
| 98/2 | 15.0 | 74.5 | 1400 | 16500 | 14.6 | 8000 | 133 | 2150 | 20.0 | +4.5 |
| 98/2 | 25.0 | 76.3 | 1650 | 19500 | 17.3 | — | — | — | 19.8 | +4.3 |
| 55/45 | 0 | 70.1 | 490 | 4500 | 15.9 | 8500 | 135 | 1900 | 21.2 | 0 |
| 55/45 | 0.1 | 75.2 | 488 | 4400 | 15.8 | 8600 | 134 | 1900 | 21.2 | +4.0 |
| 55/45 | 5.0 | 79.5 | 490 | 4500 | 15.8 | 8400 | 136 | 1950 | 20.8 | +4.4 |
| 55/45 | 15.0 | 90.0 | 491 | 4500 | 15.9 | 8500 | 136 | 1900 | 20.7 | +4.5 |
| 55/45 | 25.0 | 92.0 | 557 | 5700 | 18.5 | — | — | — | 20.5 | +4.2 |
| 30/70 | 0 | 79.7 | 345 | 3000 | 20.0 | 9000 | 169 | 950 | 26.4 | 0 |
| 30/70 | 0.1 | 83.0 | 340 | 2900 | 20.1 | 9000 | 170 | 1050 | 26.2 | +3.1 |
| 30/70 | 5.0 | 88.6 | 344 | 2900 | 20.0 | 9100 | 175 | 1700 | 25.4 | +4.3 |
| 30/70 | 15.0 | 91.3 | 345 | 3100 | 20.2 | 9200 | 178 | 1800 | 25.2 | +4.5 |
| 30/70 | 25.0 | 93.2 | 451 | 5700 | 24.6 | — | — | — | 25.0 | +4.2 |
| 20/80 | 0 | 85.9 | 305 | 2700 | 21.8 | 10200 | 182 | 700 | 28.5 | 0 |
| 20/80 | 0.1 | 87.5 | 305 | 2700 | 22.0 | 10600 | 183 | 700 | 28.6 | +3.0 |
| 20/80 | 5.0 | 92.1 | 310 | 2600 | 22.3 | 10400 | 185 | 800 | 28.2 | +4.4 |
| 20/80 | 15.0 | 96.0 | 342 | 3000 | 22.5 | 10400 | 185 | 750 | 27.8 | +4.4 |
| 20/80 | 25.0 | 96.1 | 471 | 4600 | 28.2 | — | — | — | 27.5 | +4.2 |
| 0/100 | 0 | 100.5 | 280 | 2500 | 26.2 | 10500 | 190 | 650 | 31.3 | +5 |
| 0/100 | 0.1 | 100.3 | 280 | 2600 | 26.2 | 10700 | 190 | 650 | 31.5 | +4.5 |
| 0/100 | 5.0 | 99.4 | 295 | 2900 | 27.0 | 10500 | 189 | 700 | 30.8 | +4.0 |
| 0/100 | 15.0 | 98.3 | 324 | 3200 | 27.5 | 10600 | 190 | 650 | 30.5 | +3.9 |
| 0/100 | 25.0 | 96.1 | 391 | 3600 | 32.3 | — | — | — | 30.1 | +3.9 |

EXAMPLE 4

A low density polyethylene having a melt index of 0.3 and a density of 0.928 was mixed with a saponified product of an ethylene-vinyl acetate copolymer having an ethylene content of 25 mole % and a degree of saponification of 93 % at a mixing weight ratio indicated in Table 4, and 100 parts by weight of the mixture was incorporated with 0 to 25.0 parts by weight of an ethylene-vinyl acetate copolymer having a carbonyl group concentration of 4.5 milliequivalents per gram of polymer, an ethylene content of 83 mole % and a melt index of 2.4. The resulting composition was dry-blended at room temperature. Thirty films indicated in Table 4 were molded from compositions formed in a manner as described above under the same extrusion conditions with use of the same extrusion molding apparatus as in Example 1. Each film had a thickness of about 200 μ. Properties such as mentioned in Example 2 were measured under the same measuring conditions according to the same measuring methods as in Example 2. Results are shown in Table 4.

From the results shown in Table 4, it can readily be seen that the amount extruded of the composition and the tensile elongation at breakage and appearance condition of the resulfing film can be highly improved as compared with the case of the two-component system composition (the amount added of the ethylene-vinyl acetate copolymer being zero), when the mixing ratios of the above-mentioned low density polyethylene and saponified ethylene-vinyl acetate copolymer are in the range of from 98 : 2 to 30 : 70 and the amount added of the above-mentioned ethylene-vinyl acetate copolymer is in the range of from 0.1 to 15.0 parts by weight, and that such improvement is attained without substantial degradation of such properties as the oxygen permeability, carbon dioxide gas permeability, water vapor permeability, tensile elasticity, haze value and appearance condition.

EXAMPLE 5

This Example was conducted in order to know whether or not a similar tendency would be observed when Example 4 was repeated by varying the ethylene content in the saponified ethylene-vinyl acetate copolymer. Films were prepared in the same manner as in Example 4 from compositions formed by mixing the same low density polyethylene as used in Example 1 with a saponified product of an ethylene-vinyl acetate copolymer having an ethylene content of 75 mole % and a degree of saponification of 93 %, at mixing ratios indicated in Table 5. Properties of the films were measured under the same conditions according to the same measuring methods as in Example 4. Results are shown in Table 5.

Table 4

| LDPE/IV | C | Output | QO$_2$ | QCO$_2$ | QH$_2$O | E | Sf | εf | HAZE | Appearance |
|---|---|---|---|---|---|---|---|---|---|---|
| 100/0 | 0 | 58.1 | 1100 | 16000 | 10.8 | 9500 | 185 | 1050 | 32.1 | +5.0 |
| 100/0 | 0.1 | 58.2 | 1110 | 16000 | 10.9 | 9400 | 185 | 1050 | 32.0 | +5.0 |
| 100/0 | 5.0 | 58.5 | 1110 | 16000 | 10.7 | 9500 | 187 | 1050 | 31.7 | +5.0 |
| 100/0 | 15.0 | 59.1 | 1140 | 17000 | 11.0 | 9200 | 185 | 1100 | 31.5 | +4.9 |
| 100/0 | 25.0 | 59.5 | 1260 | 18500 | 15.2 | 9000 | 184 | 1050 | 31.3 | +4.9 |
| 98/2 | 0 | 58.0 | 770 | 4540 | 11.6 | 9600 | 185 | 1000 | 32.0 | 0 |
| 98/2 | 0.1 | 58.5 | 770 | 4520 | 11.4 | 9700 | 186 | 1050 | 31.8 | +4.9 |
| 98/2 | 5.0 | 5916 | 760 | 4550 | 11.2 | 9500 | 186 | 1000 | 31.5 | +4.7 |
| 98/2 | 15.0 | 60.2 | 770 | 4510 | 11.6 | 9600 | 185 | 950 | 31.6 | +4.6 |
| 98/2 | 25.0 | 616 | 850 | 5200 | 17.0 | 9400 | 187 | 1000 | 31.1 | +4.6 |
| 55/45 | 0 | 60.2 | 22.2 | 104 | 22.0 | 10500 | 187 | 850 | 27.5 | 0 |
| 55/45 | 0.1 | 64.5 | 21.5 | 102 | 22.1 | 10300 | 389 | 850 | 27.5 | +4.2 |
| 55/45 | 5.0 | 70.4 | 22.0 | 105 | 21.4 | 10100 | 190 | 800 | 26.9 | +4.5 |
| 55/45 | 15.0 | 79.7 | 22.0 | 103 | 21.7 | 10000 | 190 | 950 | 26. | +4.6 |
| 55/45 | 25.0 | 83.7 | 27.4 | 157 | 31.2 | 9400 | 191 | 900 | 25.7 | +4.3 |
| 30/70 | 0 | 66.9 | 10.4 | 36.5 | 45.1 | 14900 | 195 | 350 | 23.0 | 0 |
| 30/70 | 0.1 | 72.2 | 10.5 | 35.9 | 44.5 | 14600 | 197 | 400 | 23.0 | +3.9 |
| 30/70 | 5.0 | 78.1 | 10.5 | 36.1 | 45.0 | 14700 | 205 | 700 | 23.0 | +4.8 |
| 30/70 | 15.0 | 84.5 | 10.6 | 36.2 | 45.3 | 14500 | 212 | 850 | 22.6 | +4.7 |
| 30/70 | 25.0 | 87.1 | 14.9 | 55.1 | 60.6 | 14400 | 210 | 800 | 22.4 | +4.5 |
| 20/80 | 0 | 70.0 | 7.8 | 26.4 | 63.3 | 17000 | 227 | 250 | 22.0 | 0 |
| 20/80 | 0.1 | 75.1 | 7.1 | 26.6 | 62.7 | 16500 | 226 | 250 | 22.2 | +3.9 |
| 20/80 | 5.0 | 81.5 | 8.0 | 26.2 | 63.0 | 16400 | 234 | 350 | 22.4 | +4.8 |
| 20/80 | 15.0 | 86.9 | 8.7 | 27.1 | 65.1 | 16500 | 236 | 350 | 22.5 | +4.6 |
| 20/80 | 25.0 | 87.4 | 11.3 | 40.3 | 88.9 | 16000 | 238 | 250 | 22.6 | +4.4 |
| 0/100 | 0 | 87.7 | 5.6 | 18.2 | 145 | 19500 | 300 | 200 | 21.5 | +5. |
| 0/100 | 0.1 | 87.7 | 5.8 | 18.5 | 142 | 18900 | 298 | 250 | 21.5 | +4.0 |
| 0/100 | 5.0 | 87.5 | 5.9 | 19.0 | 145 | 18700 | 301 | 200 | 21.8 | +4.0 |
| 0/100 | 15.0 | 87.8 | 6.2 | 20.1 | 156 | 18500 | 302 | 250 | 22.0 | +3.7 |
| 0/100 | 25.0 | 87.7 | 9.4 | 32.6 | 201 | 18100 | 299 | 250 | 22.1 | +3.5 |

Table 5

| LDPE/EV | C | Output | QO$_2$ | QCO$_2$ | QH$_2$O | E | Sf | εf | HAZE | Appearance |
|---|---|---|---|---|---|---|---|---|---|---|
| 100/0 | 0 | 58.1 | 1100 | 16000 | 10.8 | 9500 | 185 | 1050 | 32.1 | +5.0 |
| 100/0 | 0.1 | 58.2 | 1110 | 16000 | 10.9 | 9400 | 185 | 1050 | 32.0 | +5.0 |
| 100/0 | 5.0 | 58.5 | 1110 | 16000 | 10.7 | 9500 | 187 | 1050 | 31.7 | +5.0 |
| 100/0 | 15.0 | 59.1 | 1140 | 17000 | 11.0 | 9200 | 185 | 1100 | 31.5 | +4.9 |
| 100/0 | 25.0 | 59.5 | 1260 | 18500 | 15.2 | 9000 | 184 | 1050 | 31.3 | +4.9 |
| 98/2 | 0 | 58.1 | 980 | 14000 | 11.7 | 9500 | 186 | 1050 | 33.0 | 0 |
| 98/2 | 0.1 | 58.7 | 960 | 13500 | 11.7 | 9400 | 185 | 1000 | 32.9 | +5.0 |
| 98/2 | 5.0 | 59.9 | 970 | 14000 | 11.5 | 9300 | 186 | 1050 | 32.4 | +4.9 |
| 98/2 | 15.0 | 60.8 | 980 | 14000 | 11.8 | 9500 | 187 | 1050 | 32.2 | +4.9 |
| 98/2 | 25.0 | 62.0 | 1060 | 16500 | 15.9 | 9100 | 184 | 950 | 32.3 | +4.8 |
| 55/45 | 0 | 63.8 | 420 | 4300 | 14.2 | 9700 | 189 | 950 | 32.2 | 0 |
| 55/45 | 0.1 | 68.0 | 425 | 4210 | 14.3 | 9700 | 188 | 950 | 32.2 | +4.9 |
| 55/45 | 5.0 | 82.9 | 418 | 4250 | 14.1 | 9700 | 189 | 1000 | 31.8 | +4.9 |
| 55/45 | 15.0 | 86.3 | 422 | 4320 | 14.0 | 9500 | 192 | 950 | 31.6 | +4.8 |
| 55/45 | 25.0 | 89.3 | 515 | 5550 | 19.2 | 9200 | 190 | 900 | 31.5 | +4.7 |
| 30/70 | 0 | 73.5 | 330 | 2900 | 21.0 | 10200 | 190 | 800 | 31.7 | 0 |
| 30/70 | 0.1 | 78.6 | 315 | 2800 | 21.0 | 10100 | 191 | 800 | 31.8 | +4.7 |
| 30/70 | 5.0 | 84.0 | 327 | 2750 | 20.9 | 9600 | 194 | 950 | 31.4 | +4.7 |
| 30/70 | 15.0 | 91.1 | 331 | 2800 | 21.2 | 9400 | 196 | 1000 | 31.3 | +4.8 |
| 30/70 | 25.0 | 94.5 | 500 | 4460 | 29.6 | 9300 | 196 | 850 | 31.2 | +4.6 |
| 20/80 | 0 | 79.4 | 300 | 2700 | 22.5 | 10300 | 190 | 700 | 31.4 | 0 |
| 20/80 | 0.1 | 82.7 | 302 | 2700 | 22.4 | 10300 | 190 | 700 | 31.5 | +4.6 |
| 20/80 | 5.0 | 89.4 | 296 | 2640 | 22.7 | 10000 | 192 | 800 | 31.1 | +4.8 |
| 20/80 | 15.0 | 93.5 | 310 | 2720 | 22.9 | 9700 | 194 | 750 | 31.1 | +4.7 |
| 20/80 | 25.0 | 96.1 | 454 | 3940 | 31.5 | 9500 | 183 | 700 | 30.9 | +4.6 |
| 0/100 | 0 | 100.5 | 280 | 2500 | 26.2 | 10500 | 190 | 650 | 31.3 | +5 |
| 0/100 | 0.1 | 100.6 | 277 | 2500 | 26.0 | 10500 | 190 | 650 | 31.5 | +4.8 |
| 0/100 | 5.0 | 100.4 | 284 | 2520 | 27.6 | 10200 | 193 | 700 | 31.3 | +4.8 |
| 0/100 | 15.0 | 100.5 | 290 | 2600 | 28.8 | 9700 | 194 | 650 | 31.4 | +4.6 |

Table 5-continued

| LDPE/EV | C | Output | QO$_2$ | QCO$_2$ | QH$_2$O | E | Sf | ef | HAZE | Appearance |
|---|---|---|---|---|---|---|---|---|---|---|
| 0/100 | 25.0 | 100.3 | 360 | 3070 | 36.3 | 9500 | 191 | 600 | 31.0 | +4.4 |

EXAMPLE 6

A low density polyethylene having a melt index of 2.1 and a density of 0.917 and another low density polyethylene having a melt index of 0.3 and a density of 0.928 were dry-blended at room temperature individually with either of a saponified product of an ethylene-vinyl acetate copolymer having an ethylene content of 25 mole % and a degree of saponification of 99 % and another saponified product of an ethylene-vinyl acetate copolymer having an ethylene content of 75 mole % and a degree of saponification of 99 %, together with nylon-6 having a relative viscosity of 3.4 (solvent = 98% sulfuric acid; concentration = 10.0 g/l; temperature = 20°C.) and a carbonyl group concentration of 8.9 milliequivalents per gram of the polymer at mixing weight ratios indicated in Table 6. These compositions were molded into flat bottles having a thickness of about 500 μ and an inner capacity of about 210 cc by means of an extruder (screw rotation rate = 34 rpm; die portion temperature = 270°C.) equipped with a dulmadge screw having a diameter of 50 mm and a length of 1100 mm and a blow molding apparatus.

The amount extruded from the extruder, out-put (g/mm), of each composition was measured, and a prescribed area was taken from the back surface of each of the bottle and the oxygen permeability, QO$_2$ (cc/m$^2$.day.atm.200 μ) and carbon dioxide gas permeability, QCO$_2$ (cc/m$^2$.day.atm.200 μ) were determined at a temperature of 27°C. and a relative humidity of 90 % by employing a gas permeability tester. Three bottles per sample composition were charged with 200 cc of distilled water, and they were corked and allowed to stand in an atmosphere maintained at a temperature of 50°C. and a relative humidity of 10 % for 30 days. The water vapor permeability, QH$_2$O (g/m$^2$.day.50 μ) was calculated from the amount decreased of water. Further, these bottles (20 bottles per sample composition) were charged with 200 cc of saline water maintained at −5°C. and allowed to stand still at 0°C. a whole day and night. Then, they were let to fall on a concrete floor from a height of 1.2 m to obtain an average frequency of breakage, which is defined to mean the number of frequency of the tests conducted until the first bottle was broken when the test repeated 50 times with respect to 20 bottles.

Results of the determination of the amount extruded, oxygen permeability, carbon dioxide gas permeability, water vapor permeability and average frequency are shown in Table 6.

From the results shown in Table 6, it will readily be understood that in case the mixing ratio of said low density polyethylene and saponified ethylene-vinyl acetate copolymer is in the range of from 98 : 2 to 30 : 70 and the amount added of the nylon-6 is in the range of from 0.1 to 15.0 parts, the amount extruded of the composition and the falling strength of the molded bottle can be improved without substantial degradation of the gas permeation resistance.

Table 6

| d | Et | LDPE/EV | C | Output | QO$_2$ | QCO$_2$ | QH$_2$O | Nf |
|---|---|---|---|---|---|---|---|---|
| 0.917 | — | 100/0 | 0 | 200 | 1600 | 19000 | 14.8 | >50 |
| 0.917 | 25 | 100/9 | 15 | 203 | 725 | 12000 | 14.5 | >50 |
| 0.917 | 25 | 98/2 | 0 | 201 | 851 | 5500 | 14.7 | >50 |
| 0.917 | 25 | 98/2 | 0.1 | 205 | 849 | 5450 | 14.8 | >50 |
| 0.917 | 25 | 98/2 | 15 | 209 | 321 | 4400 | 15.1 | >50 |
| 0.917 | 25 | 30/70 | 0 | 218 | 5.2 | 30.4 | 40.1 | 39 |
| 0.917 | 25 | 30/70 | 0.1 | 225 | 5.3 | 30.1 | 41.5 | 40 |
| 0.917 | 25 | 30/70 | 15 | 249 | 7.4 | 27.7 | 44.7 | 42 |
| 0.917 | 25 | 0/100 | 15 | 251 | 4.9 | 18.5 | 144 | 2 |
| 0.917 | 75 | 100/0 | 15 | 203 | 725 | 12000 | 14.5 | >50 |
| 0.917 | 75 | 98/2 | 0 | 202 | 1370 | 17000 | 14.9 | >50 |
| 0.917 | 75 | 98/2 | 0.1 | 207 | 1330 | 16500 | 15.1 | >50 |
| 0.917 | 75 | 98/2 | 15 | 214 | 762 | 13000 | 15.5 | >50 |
| 0.917 | 75 | 30/70 | 0 | 224 | 172 | 2050 | 16.1 | 44 |
| 0.917 | 75 | 30/70 | 0.1 | 235 | 170 | 2000 | 16.0 | 46 |
| 0.917 | 75 | 30/70 | 15 | 282 | 152 | 1760 | 17.0 | >50 |
| 0.917 | 75 | 0/100 | 15 | 282 | 67.7 | 1520 | 17.1 | 12 |
| 0.928 | — | 100/0 | 0 | 174 | 1100 | 16000 | 10.5 | >50 |
| 0.928 | 25 | 100/0 | 15 | 177 | 492 | 10500 | 10.7 | >50 |
| 0.928 | 25 | 98/2 | 0 | 175 | 540 | 4000 | 11.1 | >50 |
| 0.928 | 25 | 98/2 | 0.1 | 178 | 536 | 3950 | 11.2 | >50 |
| 0.928 | 25 | 98/2 | 15 | 182 | 251 | 3050 | 12.0 | >50 |
| 0.928 | 25 | 30/70 | 0 | 190 | 4.6 | 30.0 | 40.3 | 34 |
| 0.928 | 25 | 30/70 | 0.1 | 197 | 4.6 | 30.2 | 40.8 | 34 |
| 0.928 | 25 | 30/70 | 15 | 245 | 5.7 | 26.4 | 42.0 | 37 |
| 0.928 | 25 | 0/100 | 15 | 251 | 4.9 | 18.5 | 144 | 2 |
| 0.928 | 75 | 100/0 | 15 | 177 | 492 | 10500 | 10.7 | >50 |
| 0.928 | 75 | 98/2 | 0 | 177 | 990 | 14000 | 11.0 | >50 |
| 0.928 | 75 | 98/2 | 0.1 | 177 | 976 | 13500 | 11.1 | >50 |
| 0.928 | 75 | 98/2 | 15 | 186 | 613 | 10500 | 11.5 | >50 |
| 0.928 | 75 | 30/70 | 0 | 198 | 130 | 2000 | 15.5 | 40 |
| 0.928 | 75 | 30/70 | 0.1 | 206 | 126 | 1950 | 15.5 | 41 |
| 0.928 | 75 | 30/70 | 15 | 278 | 113 | 1700 | 16.8 | 48 |
| 0.928 | 75 | 0/100 | 15 | 282 | 67.7 | 1520 | 17.1 | 12 |
| — | 25 | 0/100 | 0 | 258 | 1.5 | 9.6 | 97.2 | 1 |

Table 6-continued

| d | Et | LDPE/EV | C | Output | $QO_2$ | $QCO_2$ | $QH_2O$ | Nf |
|---|----|---------|---|--------|--------|---------|---------|-----|
| — | 75 | 0/100 | 0 | 294 | 70.6 | 900 | 16.9 | 9 |

EXAMPLE 7

Surlyn A (trademark) of the zinc ion type having a melt index of 0.7, a density of 0.960 and a carbonyl group concentration of 1.6 milliequivalents per gram of the polymer was used instead of nylon 6 used in Example 6, and mixtures indicated in Table 7 were prepared by employing the above ionomer and the same low density polyethylene and saponified ethylene-vinyl acetate copolymer as in Example 6 at the same resin mixing ratio as in Example 6. These mixtures were molded into bottles having the same configuration, thickness and inner capacity as those of the bottles molded in Example 6 by employing an extruder (screw rotation rate = 34 rpm; die portion temperature = 210°C.) installed with a metering screw having a diameter of 50 mm and a length of 1100 mm and a blow molding apparatus.

With respect to each sample, the amount extruded, gas permeability and falling strength were determined under the same measuring conditions according to the same measuring methods as described in Example 6. Results are shown in Table 7.

EXAMPLE 8

Mixtures indicated in Table 8 were prepared by employing the same low density polyethylene and saponified ethylene-vinyl acetate copolymer as used in Example 6 and an ethylene-vinyl acetate copolymer having an ethylene content of 83 mole %, a melt index of 2.4 and a carbonyl group concentration of 4.5 milliequivalents per gram of the polymer instead of the nylon-6 used in Example 6, at the same resin mixing ratio as in Example 6. These mixture were molded into bottles having the same configuration, thickness and inner capacity as those of the bottles molded in Example 6 by means of an extruder (screw rotation rate = 34 rpm; die portion temperature = 190°C.) installed with a metering screw having a diameter of 50 mm and a length of 1100 mm and a blow molding apparatus.

With respect to each sample, the amount extruded, gas permeability and falling strength were determined under the same conditions according to the same measuring methods as in Example 6. Results are shown in Table 8.

Table 7

| d | Et | LDPE/EV | C | output | $QO_2$ | $QCO_2$ | $QH_2O$ | Nf |
|---|----|---------|---|--------|--------|---------|---------|-----|
| 0.917 | — | 100/0 | 0 | 200 | 1600 | 19000 | 148 | >50 |
| 0.917 | 25 | 100/0 | 15 | 198 | 1600 | 19500 | 149 | >50 |
| 0.917 | 25 | 98/2 | 0 | 201 | 851 | 5500 | 147 | >50 |
| 0.917 | 25 | 98/2 | 0.o | 206 | 850 | 5500 | 149 | >50 |
| 0.917 | 25 | 98/2 | 15 | 210 | 851 | 5500 | 150 | >50 |
| 0.917 | 25 | 30/70 | 0 | 212 | 5.2 | 30.4 | 40.1 | 39 |
| 0.917 | 25 | 30/70 | 0.1 | 225 | 5.2 | 30.6 | 40.1 | 42 |
| 0.917 | 25 | 30/70 | 15 | 236 | 5.4 | 30.7 | 40.6 | 46 |
| 0.917 | 25 | 0/100 | 15 | 240 | 2.6 | 10.6 | 38.3 | 4 |
| 0.917 | 75 | 100/0 | 15 | 198 | 1600 | 19500 | 14.9 | >50 |
| 0.917 | 75 | 98/2 | 0 | 203 | 1370 | 17000 | 14.9 | >50 |
| 0.917 | 75 | 98/2 | 0.1 | 208 | 1367 | 17000 | 14.8 | >50 |
| 0.917 | 75 | 93/2 | 15 | 212 | 1385 | 17500 | 14.9 | >50 |
| 0.917 | 75 | 30/70 | 0 | 214 | 172 | 2050 | 16.1 | 44 |
| 0.917 | 75 | 30/70 | 0.1 | 243 | 172 | 2100 | 16.2 | 49 |
| 0.917 | 75 | 30/70 | 15 | 269 | 174 | 2150 | 16.4 | >50 |
| 0.917 | 75 | 0/100 | 15 | 272 | 72.5 | 1050 | 17.6 | 15 |
| 0.928 | — | 100/0 | 0 | 174 | 1100 | 16000 | 10.5 | >50 |
| 0.928 | 25 | 100/0 | 15 | 173 | 1150 | 16000 | 10.6 | >50 |
| 0.928 | 25 | 98/2 | 0 | 174 | 540 | 4000 | 11.1 | >50 |
| 0.928 | 25 | 98/2 | 0.1 | 179 | 540 | 4000 | 11.0 | >50 |
| 0.928 | 25 | 98/2 | 15 | 186 | 541 | 4000 | 11.2 | >50 |
| 0.928 | 25 | 30/70 | 0 | 188 | 4.6 | 30.0 | 40.3 | 34 |
| 0.928 | 25 | 30/70 | 0.1 | 217 | 4.7 | 300 | 40.2 | 36 |
| 0.928 | 25 | 30/70 | 15 | 235 | 5.0 | 30.3 | 40.5 | 41 |
| 0.928 | 25 | 0/100 | 15 | 240 | 2.6 | 10.6 | 98.3 | 4 |
| 0.928 | 75 | 100/0 | 15 | 173 | 1150 | 16000 | 10.6 | >50 |
| 0.928 | 75 | 98/2 | 0 | 175 | 990 | 14000 | 11.0 | >50 |
| 0.928 | 75 | 98/2 | 0.1 | 182 | 988 | 13500 | 10.9 | >50 |
| 0.928 | 75 | 98/2 | 15 | 192 | 994 | 14000 | 10.9 | >50 |
| 0.928 | 75 | 30/70 | 0 | 195 | 130 | 2000 | 15.5 | 40 |
| 0.928 | 75 | 30/70 | 0.1 | 240 | 132 | 2000 | 15.6 | 42 |
| 0.928 | 75 | 30/70 | 15 | 276 | 134 | 2050 | 15.8 | 50 |
| 0.928 | 75 | 0/100 | 15 | 272 | 72.5 | 1050 | 17.6 | 15 |
| — | 25 | 0/100 | 0 | 258 | 1.5 | 9.6 | 97.2 | 1 |
| — | 75 | 0/100 | 0 | 294 | 70.6 | 900 | 16.9 | 9 |

Table 8

| d | Et | LDPE/EV | C | Output | $QO_2$ | $QCO_2$ | $QH_2O$ | Nf |
|---|----|---------|---|--------|--------|---------|---------|-----|
| 0.917 | — | 100/0 | 0 | 200 | 1600 | 19000 | 14.8 | >50 |
| 0.917 | 25 | 100/0 | 15 | 208 | 1650 | 19500 | 14.8 | >50 |
| 0.917 | 25 | 98/2 | 0 | 202 | 851 | 5500 | 14.7 | >50 |

Table 8-continued

| d | Et | LDPE/EV | C | Out-put | QO$_2$ | QCO$_2$ | QH$_2$O | Nf |
|---|---|---|---|---|---|---|---|---|
| 0.917 | 25 | 98/2 | 0.1 | 206 | 858 | 5550 | 14.5 | >50 |
| 0.917 | 25 | 98/2 | 15 | 208 | 855 | 5550 | 14.8 | >50 |
| 0.917 | 25 | 30/70 | 0 | 216 | 5.2 | 30.4 | 40.1 | 39 |
| 0.917 | 25 | 30/70 | 0.1 | 227 | 5.2 | 30.5 | 40.2 | 40 |
| 0.917 | 25 | 30/70 | 15 | 245 | 5.7 | 31.0 | 40.7 | 43 |
| 0.917 | 25 | 0/100 | 15 | 246 | .24 | 11.0 | 99.1 | 2 |
| 0.917 | 75 | 100/0 | 15 | 208 | 1650 | 19500 | 14.8 | >50 |
| 0.917 | 75 | 98/2 | 0 | 203 | 1370 | 17000 | 14.9 | >50 |
| 0.917 | 75 | 98/2 | 0.1 | 210 | 1370 | 17000 | 14.9 | >50 |
| 0.917 | 75 | 98/2 | 15 | 224 | 1375 | 17500 | 14.9 | >50 |
| 0.917 | 75 | 30/70 | 0 | 233 | 172 | 2050 | 16.1 | 44 |
| 0.917 | 75 | 30/70 | 0.1 | 252 | 172 | 2050 | 16.2 | 47 |
| 0.917 | 75 | 30/70 | 15 | 278 | 177 | 2150 | 16.3 | >50 |
| 0.917 | 75 | 0/100 | 15 | 280 | 71.6 | 1050 | 17.8 | 13 |
| 0.928 | — | 100/0 | 0 | 174 | 1100 | 16000 | 10.5 | >50 |
| 0.928 | 25 | 100/0 | 15 | 179 | 1150 | 16500 | 10.9 | >50 |
| 0.928 | 25 | 98/2 | 0 | 176 | 540 | 4000 | 11.1 | >50 |
| 0.928 | 25 | 98/2 | 0.1 | 180 | 538 | 4000 | 11.2 | >50 |
| 0.928 | 25 | 98/2 | 15 | 185 | 544 | 4250 | 11.3 | >50 |
| 0.928 | 25 | 30/70 | 0 | 192 | 4.6 | 30.0 | 40.3 | 34 |
| 0.928 | 25 | 30/70 | 0.1 | 213 | 4.7 | 30.2 | 40.3 | 35 |
| 0.928 | 25 | 30/70 | 15 | 243 | 5.0 | 30.2 | 40.4 | 39 |
| 0.928 | 25 | 0/100 | 15 | 246 | 2.4 | 11.0 | 99.1 | 2 |
| 0.928 | 75 | 100/0 | 15 | 179 | 1150 | 16500 | 10.9 | >50 |
| 0.928 | 75 | 98/2 | 0 | 178 | 990 | 14000 | 11.0 | >50 |
| 0.928 | 75 | 98/2 | 0.1 | 183 | 992 | 14000 | 10.9 | >50 |
| 0.928 | 75 | 98/2 | 15 | 192 | 995 | 14500 | 11.0 | >50 |
| 0.928 | 75 | 30/70 | 0 | 200 | 180 | 2000 | 15.5 | 40 |
| 0.928 | 75 | 30/70 | 0.1 | 235 | 131 | 2000 | 15.6 | 41 |
| 0.928 | 75 | 30/70 | 15 | 275 | 135 | 2050 | 15.6 | 49 |
| 0.928 | 75 | 0/100 | 15 | 280 | 71.6 | 1050 | 17.8 | 13 |
| — | 25 | 0/100 | 0 | 258 | 1.5 | 9.6 | 97.2 | 1 |
| — | 75 | 0/100 | 0 | 294 | 70.6 | 900 | 16.9 | 9 |

EXAMPLE 9

A low density polyethylene having a melt index of 1.4 and a density of 0.920 was mixed with a saponified product of an ethylene-vinyl acetate copolymer having an ethylene content of 25 mole % and a degree of saponification of 99 % at a mixing weight ratio indicated in Table 9. Then, 100 parts by weight of the resulting composition was incorporated with 0 – 15.0 parts by weight of an acrylic acid grafted-polyethylene having a grafting ratio of 8.2 %, and a melt index of 0.9 and a carbonyl group concentration of 2.5 milliequivalents per gram of the polymer and the mixture was dry-blended at room temperature. The dry-blended composition blow-molded into flat bottles having a thickness of about 500 μ and an inner capacity of about 210 cc under the same extrusion conditions with use of the same extruder and blow-molding apparatus as in Example 8. The mixing ratios of resin components are shown in Table 9.

The amount extruded (out-put) of each composition and gas permeabilities (QO$_2$, QCO$_2$ and QH$_2$O) and falling strength (Nf) of each bottle sample are also shown in Table 8. The above properties were determined under the same measuring conditions according to the same measuring methods as in Example 6.

Table 9

| d | Et | LDPE/EV | C | Out-put | QO$_2$ | QCO$_2$ | QH$_2$O | Nf |
|---|---|---|---|---|---|---|---|---|
| 0.920 | — | 100/0 | 0 | 189 | 1450 | 18000 | 12.2 | >50 |
| 0.920 | 25 | 95/5 | 0 | 190 | 455 | 2400 | 12.3 | >50 |
| 0.920 | 25 | 95/5 | 5.0 | 207 | 442 | 2100 | 12.3 | >50 |
| 0.920 | 25 | 95/5 | 15.0 | 216 | 450 | 2400 | 12.6 | >50 |
| 0.920 | 25 | 85/15 | 0 | 192 | 175 | 815 | 12.5 | >50 |
| 0.920 | 25 | 85/15 | 5.0 | 219 | 170 | 800 | 12.4 | >50 |
| 0.920 | 25 | 85/15 | 15.0 | 230 | 168 | 805 | 12.7 | >50 |
| 0.920 | 25 | 30/70 | 0 | 196 | 9.2 | — | 47.5 | 6 |
| 0.920 | 25 | 30/70 | 5.0 | 229 | 3.1 | — | 47.6 | 42 |
| 0.920 | 25 | 30/70 | 15.0 | 244 | 9.0 | — | 48.0 | 39 |
| — | 25 | 0/100 | 0 | 246 | 1.5 | 9.6 | 97.2 | 1 |

(—; not measured)

EXAMPLE 10

100 Parts by weight of a 85 : 15 (weight ratio) of the same low density polyethylene and saponified ethylene-vinyl acetate copolymer was incorporated with 0, 5.0 or 15.0 parts by weight of a polyvinyl acetate having a carbonyl group concentration of 11.6 milliequivalents per gram of the polymer and having an intrinsic viscosity of 1.53 d l/g measured at 30°C. in acetone. The resulting composition was pelletized by means of a pelletizer (screw rotation rate = 14.5 rpm; temperature = 200°C.) equipped with a nylon type screw having a diameter of 40 mm and a length of 1120, and the resulting pelletized product was blow-molded into flat bottles having a thickness of about 500 μ and an inner capacity of about 210 cc under the same extrusion conditions with use of the same extruder and blow-molder as in Example 8.

The amount extruded (out-put) of each composition and gas permeabilities ($QO_2$, $QCO_2$ and $QH_2O$) and falling strength (Nf) of each bottle sample are shown in Table 10. These properties were determined under the same measuring conditions according to the same measuring methods as in Example 6.

blow-molded into flat bottles having a thickness of about 500 μ and an inner capacity of about 210 cc by means of an extruder (rotation rate = 34 rpm; die portion temperature = 210°C.) equipped with a metering screw having a diameter of 50 mm and a length of 1100 mm and a blow-molding apparatus.

The amount extruded of the composition was 217 g/mm, and the oxygen permeability and water permeability of the molded bottle were 174 $cc/m^2.day.atm.50$ μ (at a temperature of 50°C. and a relative humidity of Table 10

| d | Et | LDPE/EV | C | Out-put | $QO_2$ | $QCO_2$ | $QH_2O$ | Nf |
|---|---|---|---|---|---|---|---|---|
| 0.920 | 0 | 100/0 | 0 | 189 | 1450 | 18000 | 12.2 | >50 |
| 0.920 | 25 | 85/15 | 0 | 192 | 175 | 815 | 12.5 | >50 |
| 0.920 | 25 | 85/15 | 5.0 | 221 | 165 | 780 | 12.6 | >50 |
| 0.920 | 25 | 85/15 | 15.0 | 234 | 166 | 800 | 12.6 | >50 |
| — | 25 | 0/100 | 0 | 246 | 1.5 | 9.6 | 97.2 | 1 |

EXAMPLE 11

100 Parts by weight of a 85 : 15 (weight ratio) mixture of a low density polyethylene having a melt index of 1.4 and a density of 0.920 and a saponified product of an ethylene-vinyl acetate copolymer having an ethylene content of 40 mole % and a degree of saponification of 99 % was incorporated with 0, 5.0 or 15.0 parts by weight of an ethylene-ethyl acrylate copolymer having a carbonyl group concentration of 3.1 milliequivalents per gram of the polymer, an ethylene content of 89 mole % and a melt index of 6.2, and the resulting composition was blended at room temperature. Then, the composition was blow-molded into flat bottles having a thickness of about 500 μ and an inner capacity of about 210 cc under the same extrusion conditions with use of the same extruder and blow-molding apparatus as in Example 8.

The amount extruded (out-put) of each composition and the gas permeabilities ($QO_2$, $QCO_2$ and $QH_2O$) and falling strength (Nf) of each molded bottle are shown in Table 11. These properties were determined under the same measuring conditions according to the same measuring methods as described in Example 6.

10 %), respectively. The average frequency of breakage (falling strength) of the bottle was more than 50 times. These properties were determined under the same measuring conditions according to the same measuring methods as described in Example 6.

EXAMPLE 13

100 Parts by weight of a 85 : 15 (weight ratio) mixture of a low density polyethylene having a melt index of 2.1 and a density of 0.917 and a saponified product of an ethylene-vinyl acetate copolymer having an ethylene content of 40 mole % and a degree of saponification of 99% was incorporated with 10.0 parts by weight of an ethylene-vinyl acetate copolymer having a carbonyl group concentration of 4.5 milliequivalents per gram of the polymer, an ethylene content of 83 mole % and a melt index of 2.4 and 10.0 parts by weight of a polyisobutylene having an average molecular weight of 1,000,000. The resulting composition was pelletized with use of an extruder equipped with a twin screw having a diameter of 65 mm (screw rotation rate = 150 rpm; die portion temperature = 280°C.). The pelletized product was molded into a bottle having the same configuration, thickness and inner capacity as those of the Table 11

| d | Et | LDPE/EV | C | Out-put | $QO_2$ | $QCO_2$ | $QH_2O$ | Nf |
|---|---|---|---|---|---|---|---|---|
| 0.920 | — | 100/0 | 0 | 189 | 1450 | 18000 | 12.2 | >50 |
| 0.920 | 40 | 85/15 | 0 | 193 | 236 | 1150 | 12.3 | >50 |
| 0.920 | 40 | 85/15 | 5.0 | 228 | 217 | 1100 | 12.4 | >50 |
| 0.920 | 40 | 85/15 | 15.0 | 250 | 220 | 1100 | 12.3 | >50 |
| — | 40 | 0/100 | 0 | 262 | 4.8 | 78.1 | 45.6 | 2 |

EXAMPLE 12

100 Parts by weight of a 85 : 15 (weight ratio) mixture of a low density polyethyene having a melt index of 1.4 and a density of 0.920 and a saponified product of an ethylene-vinyl acetate copolymer having an ethylene content of 25 mole % and a degree of saponification of 99 % was incorporated with 5.0 parts by weight of an acrylic acid-grafted polyethylene having a carbonyl group concentration of 2.5 milliequivalents per gram of the polymer, a grafting ratio of 8.2 % and a melt index of 0.9 and an isotactic polypropylene having a melt index of 1.0, and the resulting composition was dry-blended. Then, the dry-blended composition was bottle molded in Example 12, under the same extrusion conditions with use of the same extruder and blow-molding apparatus as in Example 12.

At the time of extrusion of the pelletized composition, the amount extruded was 235 g/min. The oxygen permeability and water vapor permeability of the molded bottle were 225 $cc/m^2/day.atm.200$ μ and 12.5 $g/m^2.day.atm.50$ μ, respectively. The average frequency of breakage (falling strength) of the molded bottle was more than 50 times. These properties were determined under the same conditions according to the same measuring methods as in Example 6.

EXAMPLE 14

A low density polyethylene having a density of 0.920, a melt index of 0.3 and a density of the melt at 240°C. of 0.736 was melt-extruded at a screw rotation rate of 150 rpm and a resin temperature at the die portion of 240°C. by means of an extruder equipped with a metering screw having a diameter of 65 mm and an effective length of 1690 mm and a die land portion having a die lip of 2 mm and a length of 300 mm, and the average flow rate of 3.8 cm/sec was calculated from the amount extruded (62.5 Kg/hr). Separately, a saponified product of an ethylene-vinyl acetate copolymer having an ethylene content of 49.4 mole %, a degree of saponification of 99.2 % and a density of the melt at 240°C. of 0.975 was melt-extruded under the same conditions with use of the same extruder as described above, and the average flow rate of 4.9 cm/sec was calculated from the amount extruded (108.5 Kg/hr). Furthermore, Surlyn A (ionomer produced by Du Pont, U.S.A.) of the sodium ion type having a carbonyl group concentration of 160 milliequivalents per 100 g of the polymer and a density of the melt at 240°C. of 0.782 was melt-extruded, as the carbonyl group-containing thermoplastic polymer, under the same conditions with use of the same extruder as described above. The average flow rate of 3.9 cm/sec was calculated from the amount extruded (68.1 Kg/hr).

100 Parts by weight of a 95 : 5 (weight ratio) mixture of the above low density polyethylene and saponified ethylene-vinyl acetate copolymer was incorporated with 5 parts by weight of the above Surlyn A, and the resulting composition was dry-blended at room temperature for 5 minutes by means of a dry-blender of the tumbler type to effect the preliminary mixing.

The resulting dry-blended composition was melt-extruded under the same extrusion conditions with use of the same extruder as described above, and molded into a cylindrical film having an average thickness of 150 $\mu$ and a diameter of 30 cm according to a known inflation molding method. At this operation, the resin pressure at the die portion was 135 Kg/cm².

A prescribed area (a disc having a diameter of 7 cm) was taken from the resulting film, and the oxygen permeability was measured at 27°C. and a relative humidity on the atmospheric pressure side of 90 % by employing a gas permeability tester (pressure method), and it was found that the sample had an oxygen permeability of 494 cc/m².day.atm.150 $\mu$.

Samples were collected according to the sampling method described in the text of the specification, and each sample was divided into three layers in the thickness direction with use of a microtome. Each layer had a thickness of about 50 $\mu$.

Each of the so obtained layer samples was pressed for 2 minutes at 195°C. by employing a high pressure press under a pressure of 150 Kg/cm² to obtain a thin film having a thickness of about 16 $\mu$. With respect to each sample, the absorption at 3320 cm$^{-1}$ was measured at temperature of 20°C. and a relative humidity of 40 % by means of an infrared spectrophotometer. The log($I_o/I$)/$\overline{\mu}$ values, saponified ethylene-vinyl acetate copolymer concentration, and $m_1$ and $m_2$ values of each layer are shown in Table 12.

Table 12

(Saponified Copolymer Content = 4.8 % by weight)

| Identification of layer | $\dfrac{\log(I_o/I)}{\overline{\mu}} \times 10^3$ | Concentration of saponified product (% by weight) | $m_1$ | $m_2$ |
|---|---|---|---|---|
| A-1 | 0.3 | 0.6 | | 0.12 |
| B-1 | 0.3 | 0.6 | | 0.12 |
| C-1 | 0.2 | 0.5 | | 0.10 |
| D-1 | 0.3 | 0.6 | | 0.12 |
| A-2 | 5.5 | 13 | 2.71 | |
| B-2 | 5.5 | 13 | 2.71 | |
| C-2 | 5.6 | 13 | 2.71 | |
| D-2 | 5.5 | 13 | 2.71 | |
| A-3 | 0.5 | 1.3 | | 0.27 |
| B-3 | 0.5 | 1.3 | | 0.27 |
| C-3 | 0.5 | 1.3 | | 0.27 |
| D-3 | 0.5 | 1.3 | | 0.27 |

EXAMPLE 15

100 Parts by weight of a 75 : 25 (weight ratio) mixture of a low density polyethylene having the same properties and average flow rate as those of the polyethylene as used in Example 14 and a saponified product of an ethylene-vinyl acetate copolymer having the same properties and average flow rate as those of the saponified copolymer employed in Example 14 was incorporated with 5 parts by weight of Surlyn A (a resin having the same properties and average flow rate as those of the carbonyl group-containing thermoplastic polymer used in Example 14), and the resulting composition was preliminarily mixed (dry-blended) under the same conditions with use of the same apparatus as in Example 14.

The dry-blended composition was molded into a cylindrical film having an average thickness of 150 $\mu$ and a diameter of 30 cm under the same extrusion conditions with use of the same extruder according to the same molding method as described in Example 14. At this operation, the resin pressure at the die portion was 130 Kg/cm².

A prescribed area (a disc having a diameter of 7 cm) was taken from the so molded film, and the oxygen permeability was measured under the same conditions with use of the same tester as in Example 14. As a result, the film was found to have an oxygen permeability of 36 cc/m².day.atm.150 $\mu$.

Samples were collected according to the sampling method described in the text of the specification, and each sample was divided into three layers in the thickness direction by means of a microtome. Each layer had a thickness of about 50 $\mu$.

Each of the sample layers was pressed under a pressure of 120 Kg/cm² by means of a high pressure press under the same conditions as in Example 14 to obtain a thin film having a thickness of about 18 $\mu$, and the absorption at 3320 cm$^{-1}$ was measured by means of an infrared spectrophotometer under the same conditions as in Example 14. The log($I_o/I$)/$\overline{\mu}$ value, saponified ethylene-vinyl acetate copolymer concentration, and $m_1$ and $m_2$ values of each layer are shown in Table 13.

Table 13

(Saponified Copolymer Content = 24 % by weight)

| Identification of layer | $\frac{\log(I_0/I)}{\mu} \times 10^3$ | Concentration of saponified product (% by weight) | $m_1$ | $m_2$ |
|---|---|---|---|---|
| A-1 | 4.5 | 11 | | 0.46 |
| B-1 | 4.4 | 11 | 0.46 | |
| C-1 | 4.4 | 11 | | 0.46 |
| D-1 | 4.5 | 11 | | 0.46 |
| A-2 | 15.7 | 37 | 1.54 | |
| B-2 | 15.7 | 37 | 1.54 | |
| C-2 | 15.7 | 37 | 1.54 | |
| D-2 | 15.7 | 37 | 1.54 | |
| A-3 | 11.0 | 26 | 1.08 | |
| B-3 | 11.1 | 26 | 1.08 | |
| C-3 | 11.1 | 26 | 1.08 | |
| D-3 | 11.1 | 26 | 1.08 | |

EXAMPLE 16

A low density polyethylene having a density of 0.920, a melt index of 0.3 and a density of the melt at 190°C. of 0.764 was melt-extruded at a screw rotation rate of 30 rpm and a resin temperature at the die portion of 190°C. by means of an extruder equipped with a metering screw having a diameter of 150 mm and an effective length of 3300 mm and a die having a diameter of 40 mm and a length of 1100 mm, and the average flow rate of 6.1 cm/sec was calculated from the amount extruded (210.4 Kg/hr). Separately, a saponified product of an ethylene-vinyl acetate copolymer having an ethylene content of 25.4 mole %, a degree of saponification of 99.2 %, an intrinsic viscosity of 0.08 l/g and a density of the melt at 190°C. of 1.065 was melt-extruded under the same conditions with use of the same extruder as described above, and the average flow rate of 7.3 cm/sec was calculated from the amount extruded (352.7 Kg/hr). Furthermore, an ethylene-ethyl acrylate copolymer having a carbonyl group concentration of 520 milliequivalents per 100 g of the polymer and a density of the melt at 190°C. of 0.835 was melt-extruded, as the carbonyl group-containing thermoplastic polymer, under the same conditions with use of the same extruder as described above, and the average flow rate of 6.0 cm/sec was calculated from the amount extruded (231.8 Kg/hr).

100 Parts by weight of a 90 : 10 (weight ratio) mixture of the above low density polyethylene and saponified ethylene-vinyl acetate copolymer was incorporated with 0.5 part by weight of the above ethylene-ethyl acrylate copolymer, and the resulting composition was dry-blended (preliminarily mixed) at room temperature for 1 minute by means of a dry-blender of the Henschel type.

The so dry-blended composition was melt-extruded under the same conditions with use of the same extruder as described above, and molded into an ellipsoidal bottle having an average thickness of 600 μ, a long axis of 14 cm and a short axis of 5 cm according to a known blow-molding method. At this operation, the resin pressure at the die portion was 285 Kg/cm².

A prescribed area (a disc having a diameter of 7 cm) was taken from he back surface of the resulting bottle in the direction of the long axis, and the oxygen permeability was measured under the same conditions with use of the same tester as in Example 14. As a result, the sample was found to have an oxygen permeability of 35 cc/m².day.atm.600 μ.

Samples were collected according to the sampling method described in the text of the specification, and each sample was divided into three layers in the thickness direction by means of a microtome. Each layer had a thickness of about 200 μ.

Each sample layer was pressed under a pressure of 70 Kg/cm² by means of a high pressure press under the same conditions as in Example 14 to obtain a thin film having a thickness of about 46 μ, and the absorption at 3320 cm⁻¹ was measured by means of an infrared spectrophotometer under the same conditions as in Example 14. The $\log(I_0/I)/\bar{\mu}$ value, saponified ethylene-vinyl acetate copolymer concentration, and $m_1$ and $m_2$ values of each layer are shown in Table 14.

Table 14

(Saponified Copolymer Content = 10 % by weight)

| Identification of layer | $\frac{\log(I_0/I)}{\mu} \times 10^3$ | Concentration of saponified product (% by weight) | $m_1$ | $m_2$ |
|---|---|---|---|---|
| A-1 | 6.7 | 7.9 | | 0.79 |
| B-1 | 6.8 | 8.0 | | 0.80 |
| C-1 | 6.9 | 8.1 | | 0.81 |
| D-1 | 7.0 | 8.2 | | 0.82 |
| A-2 | 7.3 | 8.6 | | 0.86 |
| B-2 | 7.5 | 8.8 | | 0.88 |
| C-2 | 7.5 | 8.8 | | 0.88 |
| D-2 | 7.2 | 8.5 | | 0.85 |
| A-3 | 11.5 | 13 | 1.30 | |
| B-3 | 11.2 | 13 | 1.30 | |
| C-3 | 11.1 | 13 | 1.30 | |
| D-3 | 11.3 | 13 | 1.30 | |

The bottle obtained according to the above-mentioned method was then crushed by means of a grinder until the volume of the crushed pieces was less than 1cm³. Then, the crushed pieces were melt-extruded again under the same extrusion conditions with use of the same extruder as described above, and molded into an ellipsoidal bottle having an average thickness of 600 μ, a long axis of 14 cm and a short axis of 5 cm according to a known blow-molding method. At this operation, the resin pressure at the die portion was 290 Kg/cm².

A prescribed area (a disc having a diameter of 7 cm) was taken from the back face portion of the resulting bottle, and the oxygen permeability was measured under the same conditions with use of the same tester as in Example 14. As a result, the sample was found to have an oxygen permeability of 37 cc/m².day.atm.600 μ.

Samples were collected according to the sampling method described in the text of the specification, and each sample was divided into three layers in the thickness direction by means of a microtome. Each layer had a thickness of about 200 μ.

Each layer sample was pressed under a pressure of 70 Kg/cm² with use of a high pressure press under the same conditions as in Example 14 to obtain a thin film having a thickness of about 45 μ, and the absorption at 3320 cm⁻¹ was measured by means of an infrared sectrophotometer under the same conditions as in Example 14. The $\log(I/I)/\mu$ value, saponfied ethylene-vinyl acetate copolymer concentration, and $m_1$ and $m_2$ values are shown in Table 15.

Table 15

(Saponified Copolymer Content = 10 % by weight)

| Identification of layer | $\frac{\log(Io/I)}{\mu} \times 10^3$ | Concentration of saponified product (% by weight) | $m_1$ | $m_2$ |
|---|---|---|---|---|
| A-1 | 7.0 | 8.3 | | 0.83 |
| B-1 | 7.0 | 8.3 | | 0.83 |
| C-1 | 6.9 | 8.2 | | 0.82 |
| D-1 | 7.0 | 8.3 | | 0.83 |
| A-2 | 7.7 | 9.1 | | 0.91 |
| B-2 | 7.8 | 9.2 | | 0.92 |
| C-2 | 7.6 | 9.0 | | 0.90 |
| D-2 | 7.6 | 9.0 | | 0.90 |
| A-3 | 10.7 | 13 | 1.30 | |
| B-3 | 10.6 | 13 | 1.30 | |
| C-3 | 11.0 | 13 | 1.30 | |
| D-3 | 10.9 | 13 | 1.30 | |

EXAMPLE 17

100 Parts by weight of a 75 : 25 (weight ratio) mixture of a low density polyethylene having the same properties and average flow rte as those of the low density polyethylene used in Example 16 and a saponified product of an ethylene-vinyl acetate copolymer having the same physical properties and average flow rate as those of the saponified ehtylene-vinyl acetate copolymer used in Example 16 was incorporated with 0.5 part by weight of an ethylene-ethyl acrylate copolymer (a resin having the same physical properties and average flow rate as those of the carbonyl group-containing thermoplastic polymer used in Example 16), and the composition was preliminarily mixed (dry-blended) under the same conditions with use of the same apparatus as in Example 16.

The so dry-blended composition was molded into an ellipsoidal bottle having an average thickness of 600 $\mu$, a long axis length of 14 cm and a short axis length of 5 cm under the same extrusion conditions with use of the same extruder according to the same molding method as in Example 16. At this operation, the resin pressure at the die portion was 270 Kg/cm².

A prescribed area (a disc having a diameter of 7 cm) was taken from the back face portion (in the direction of the long axis) of the resulting bottle, and the oxygen permeability was measured under the same conditions with use of the same tester as in Example 14. As a result, the sample was found to have an oxygen permeability of 7 cc/m².day.atm.600 $\mu$.

Samples were collected from the bottle according to the sampling method descirbed in the text of the specification, and each sample was divided into three layers in the thickness direction by means of a microtome. Each layer had a thickness of about 200 $\mu$.

Each layer sample was pressed under a pressure of 150 Kg/cm² by means of a high pressure press under the same conditions as in Example 14 to obtain a thin film having a thickness of about 16 $\mu$, and the absorption at 3320 cm⁻¹ was measured by means of an infrared spectrophotometer under the same conditions as in Example 14. The log (Io/I)/$\overline{\mu}$ value, saponified ethylene-vinyl acetate copolymer concentration, and $m_1$ and $m_2$ values of each layer are shown in Table 16.

Table 16

(Saponified Copolymer Content = 25 % by weight)

| Identification of layer | $\frac{\log(Io/I)}{\mu} \times 10^3$ | Concentration of saponified product (% by weight) | $m_1$ | $m_2$ |
|---|---|---|---|---|
| A-1 | 17.1 | 20 | | 0.80 |
| B-1 | 17.1 | 20 | | 0.80 |
| C-1 | 17.5 | 21 | | 0.84 |
| D-1 | 17.1 | 20 | | 0.80 |
| A-2 | 19.1 | 23 | | 0.92 |
| B-2 | 19.2 | 23 | | 0.92 |
| C-2 | 18.6 | 22 | | 0.88 |
| D-2 | 18.9 | 22 | | 0.88 |
| A-3 | 27.4 | 32 | 1.28 | |
| B-3 | 27.4 | 32 | 1.28 | |
| C-3 | 27.3 | 32 | 1.28 | |
| D-3 | 27.6 | 32 | 1.32 | |

The vessel molded according to the above-mentioned method was crushed by means of a grinder until the volume of the crushed pieces was less than 1 cm³, and the crushed pieces were melt-extruded again under the same conditions with use of the same extruder as described above and molded again into an ellipsoidal bottle having an average thickness of 600 $\mu$, a long axis length of 14 cm and a short axis length of 5 cm according to a known blow-molding method. At this operation, the resin pressure at the die portion was 275 Kg/cm².

A prescribed area (a disc having a diameter of 7 cm) was taken from the back face portion of the resulting bottle, and the oxygen permeability was measured under the same conditions with use of the same tester as in Example 14. As a result, the sample was found to have an oxygen permeability of 9 cc/m².day.atm.600 $\mu$.

Samples were collected according to the sampling method described in the text of the specification, and each sample was divided into three layers in the thickness direction by means of a microtome. Each layer had a thickness of about 200 $\mu$.

Each sample layer was pressed under 150 Kg/cm² with use of a high pressure press under the same conditions as in Example 14 to obtain a thin film having a thickness of about 18 $\mu$, and the absorption at 3320 cm⁻¹ was measured by means of an infrared spectrophotometer under the same conditions as in Example 14. The log(Io/I)$\overline{\mu}$ value, saponified ethylene-vinyl acetate copolymer concentration, and $m_1$ and $m_2$ values of each layer are shown in Table 17.

Table 17

(Saponified Copolymer Content = 25 % by weight)

| Identification of layer | $\frac{\log(Io/I)}{\mu} \times 10^3$ | Concentration of saponified product (% by weight) | $m_1$ | $m_2$ |
|---|---|---|---|---|
| A-1 | 17.6 | 21 | | 0.84 |
| B-1 | 17.6 | 21 | | 0.84 |
| C-1 | 17.7 | 21 | | 0.84 |
| D-1 | 17.6 | 21 | | 0.84 |
| A-2 | 19.4 | 23 | | 0.92 |
| B-2 | 19.3 | 23 | | 0.92 |
| C-2 | 19.3 | 23 | | 0.92 |
| D-2 | 19.4 | 23 | | 0.92 |
| A-3 | 26.7 | 31 | 1.24 | |
| B-3 | 26.8 | 31 | 1.24 | |
| C-3 | 26.7 | 31 | 1.24 | |
| D-3 | 26.7 | 31 | 1.24 | |

EXAMPLE 18

A low density polyethylene having a density of 0.920, a melt index of 2.0 and a density of the melt at 240°C. of 0.735 was melt-extruded at a screw rotation rate of 100 rpm and a resin temperature at the die portion of 240°C. by employing an extruder equipped with a metering screw having a diameter of 65 mm and an effective length of 1430 mm and a die having a diameter of 15 mm and a length of 800 mm, and the average flow rate of 17.1 cm/sec was calculated from the amount extruded (79.9 Kg/hr). Separately, a saponified product of an ethylene-vinyl acetate copolymer having an ethylene content of 25.4 mole %, a degree of saponification of 99.2 %, an intrinsic viscosity of 0.08 l/g and a density of the melt at 240°C. of 1.025 was melt-extruded under the same extrusion conditions with use of the same extruder as described above, and the average flow rate of 12.1 cm/sec was calculated from the amount extruded (79.0 Kg/hr). As the carbonyl group-containing thermoplastic polymer, an ethylene-vinyl acetate copolymer having a carbonyl group concentration of 240 milliequivalents per 100 g of the polymer and a density of the melt at 240°C. of 0.804 was melt-extruded under the same extrusion conditions with use of the same extruder as described above, and the average flow rate of 16.1 cm/sec was calculated from the amount extruded (82.6 Kg/hr).

100 Parts by weight of a 95 : 5 (weight ratio) mixture of the above low density polyethylene and saponified ethylene-vinyl acetate copolymer was incorporated with 15.0 parts by weight of the above ethylene-vinyl acetate copolymer, and the composition was dry-blended (preliminarily mixed) at room temperature for 5 minutes by employing a dry-blender of the tumbler type.

The so dry-blended composition was melt-extruded under the same conditions with use of the same extruder as described above, and molded into an ellipsoidal bottle having an average thickness of 600 $\mu$, a long axis length of 9 cm and a short axis length of 3 cm according to a known blow-molding method. At this operation, the resin pressure at the die portion was 31 Kg/cm$^2$.

A prescribed area (a disc having a diameter of 7 cm) was taken from the back face portion (in the long axis direction) of the bottle, and the oxygen permeability was measured under the same conditions with use of the same tester as in Example 14. As a result, the sample was found to have an oxygen permeability of 62 cc/m$^2$. day.atm.600 $\mu$.

Samples were collected according to the sampling method described in the text of the specification, and each sample was divided into three layers in the thickness direction by means of a microtome. Each layer had a thickness of about 200 $\mu$.

Each sample layer was pressed under a pressure of 50 Kg/cm$^2$ with use of a high pressure press under the same conditions as in Example 14 to obtain a thin film having a thickness of about 79 $\mu$, and the absorption at 3320 cm$^{-1}$ was measured by means of an infrared spectrophotometer under the same conditions as in Example 14. The $\log(Io/I)\overline{\mu}$ value, saponified ethylene-vinyl acetate copolymer concentration, and $m_1$ and $m_2$ values of each layer are shown in Table 18.

Table 18

(Saponified Copolymer Content = 4.3 % by weight)

| Identification of layer | $\dfrac{\log(Io/I)}{\overline{\mu}} \times 10^3$ | Concentration of saponified product (% by weight) | $m_1$ | $m_2$ |
|---|---|---|---|---|
| A-1 | 8.9 | 11 | 2.56 | |
| B-1 | 9.0 | 11 | 2.56 | |
| C-1 | 9.0 | 11 | 2.56 | |
| D-1 | 8.9 | 11 | 2.56 | |
| A-2 | 1.2 | 1.4 | | 0.33 |
| B-2 | 1.2 | 1.4 | | 0.33 |
| C-2 | 1.2 | 1.4 | | 0.33 |
| D-2 | 1.3 | 1.5 | | 0.35 |
| A-3 | 0.9 | 1.0 | | 0.23 |
| B-3 | 0.8 | 0.9 | | 0.21 |
| C-3 | 0.8 | 0.9 | | 0.21 |
| D-3 | 0.8 | 0.9 | | 0.21 |

EXAMPLE 19

100 Parts by weight of a 85 : 15 (weight ratio) mixture of a low density polyethylene having the same physical properties and average flow rate as those of the low density polyethylene used in Example 18 and a saponified product of an ethylene-vinyl acetate copolymer having the same physical properties and average flow rate as those of the saponified copolymer used in Example 13 was incorporated with 15.0 parts by weight of an ethylene-vinyl acetate copolymer (a resin having the same physical properties and average flow rate as those of the carbonyl group-containing thermoplastic polymer used in Example 18), and the preliminary mixing (dry-blending) was carried out under the same conditions with use of the same apparatus as in Example 18.

The dry-blended composition was molded into an ellipsoidal bottle having an average thickness of 600 $\mu$, a long axis length of 9 cm and a short axis length of 3 cm under the same extrusion conditions, with use of the same extruder and according to the same molding method as in Example 18. At this operation, the resin pressure at the die portion was 28 Kg/cm$^2$.

A prescribed area (a disc having a diameter of 7 cm) was taken from the back face portion (in the long axis direction) of the bottle, and the oxygen permeability was measured under the same conditions with use of the same tester as in Example 18. As a result, the sample was found to have an oxygen permeability of 11 cc/m$^2$. day.atm.600 $\mu$.

Samples were collected according to the method described in the text of the specification, and each sample was divided into three layers in the thickness direction by means of a microtome. In each sample, the layer 1 had a thickness of 150 $\mu$, the layer 2 had a thickness of 200 $\mu$ and the layer 3 had a thickness of 250 $\mu$.

Each layer sample was pressed under a pressure of 100 Kg/cm$^2$ by means of a high pressure press under the same conditions as in Example 14 to obtain a thin film having a thickness of about 24 $\mu$, and the absorption at 3320 cm$^{-1}$ was measured with use of an infrared spectrophotometer under the same conditions as in Example 14. The $\log(Io/I)\overline{\mu}$ value, saponified ethylene-vinyl acetate copolymer concentration, and $m_1$ and $m_2$ values of each layer are shown in Table 19.

Table 19

(Saponified Copolymer Content = 13 % by weight)

| Identification of layer | $\frac{\log(Io/I)}{\mu} \times 10^3$ | Concentration of saponified product (% by weight) | $m_1$ | $m_2$ |
|---|---|---|---|---|
| A-1 | 18.7 | 22 | 1.69 | |
| B-1 | 18.7 | 22 | 1.69 | |
| C-1 | 18.6 | 22 | 1.69 | |
| D-1 | 18.6 | 22 | 1.69 | |
| A-2 | 12.0 | 14 | 1.08 | |
| B-2 | 12.1 | 14 | 1.08 | |
| C-2 | 11.9 | 14 | 1.08 | |
| D-2 | 11.9 | 14 | 1.08 | |
| A-3 | 2.8 | 3.8 | | 0.25 |
| B-3 | 2.4 | 2.8 | | 0.22 |
| C-3 | 2.6 | 3.1 | | 0.24 |
| D-3 | 2.6 | 3.1 | | 0.24 |

For comparison, a 87 : 13 (weight ratio) mixture of the above-mentioned low density polyethylene and saponified ethylene-vinyl acetate copolymer was dry-blended under the same conditions with use of the same extruder as described above.

The dry-blended composition was molded into a bottle having the same configuration and average thickness as described above, under the same extrusion conditions, with use of the same extruder and according to the same molding method as described above. At this operation, the resin pressure at the die portion was 35 Kg/cm².

The transparency and smoothness (degree of aventurine roughness appearing on the body portion of the bottle) of both the bottle molded from the two-component system composition of the low density polyethylene and saponified ethylene-vinyl acetate copolymer and the bottle molded from the three-component system composition of the low density polyethylene, saponified ethylene-vinyl acetate copolymer and ethylene-vinyl acetate copolymer were compared and evaluated. The evaluation of the transparency was made by the visual determination method. More specifically, above two bottles were presented before a panel of 25 men and an answer was requested as to which bottle was superior in transparency. At this test, 3 men of the panel replied that the bottle molded from the two-component system composition was superior in transparency, and 22 men evaluated that the bottle molded from the three-component system composition was superior in transparency. The smoothness was similarly evaluated according to the visual determination by a panel of 25 men. Namely, the two bottles were presented before the panel and an answer was requested as to which bottle was of less roughness. Any one of the panel did not reply that the bottle of the two-component composition was of less roughness, and 25 men of the panel evaluated that the bottle of the three-component composition was of less roughness.

Ten bottles of the two-component system composition and ten bottles of the three-component system composition were taken, and each of them was filled with saline water maintained at −5°C. (the volume of filled saline water being 260 cc) and allowed to stand still a whole day and night in an atmosphere maintained at 0°C. Then, the bottles were let to fall on a concrete floor from a height of 120 cm to evaluate the breakage resistance. The above falling test was repeated 10 times. In the case of the bottles of the two-component system composition, eight bottles were broken at the first falling test, and the remaining two bottles were broken at the second falling test. In the case of the bottles of the three-component system composition, one bottle was broken at the second falling test, two bottles were broken at the 6th falling test, but the remaining 7 bottles were not broken even after the falling test was repeated 10 times.

EXAMPLE 20

100 Parts by weight of a 75 : 25 (weight ratio) mixture of a low density polyethylene having the same physical properties and average flow rate as those of the low density polyethylene used in Example 18 and a saponified product of an ethylene-vinyl acetate copolymer having the same physical properties and average flow rate as those of the saponified copolymer used in Example 18 was incorporated with 15.0 parts by weight of an ethylene-vinyl acetate copolymer (a resin having the same physical properties and average flow rate as those of the carbonyl group-containing thermoplastic polymer used in Example 18), and the composition was dry-blended (preliminarily mixed) under the same conditions with use of the same apparatus as in Example 18.

The dry-blended composition was molded into an ellipsoidal bottle having an average thickness of 600 μ, a long axis length of 9 cm and a short axis length of 3 cm under the same extrusion conditions, with use of the same extruder and according to the same molding method as in Example 18. At this operation, the resin pressure at the die portion was 26 Kg/cm².

A prescribed area (a disc having a diameter of 7 cm) was taken from the back face portion (in the long axis direction) of the bottle, and the oxygen permeability was determined under the same conditions with use of the same tester as in Example 14. As a result, the sample was found to have an oxygen permeability of 5 cc/m².day.atm.600 μ.

Samples were collected according to the sampling method described in the text of the specification, and each sample was divided into three layers in the thickness direction by means of a microtome. The layer 1 had a thickness of 300 μ, the layer 2 had a thickness of 150 μ and the layer 3 had a thickness of 150 μ.

Each layer sample was pressed under a pressure of 150 Kg/cm² by means of a high pressure press under the same conditions as in Example 14 to obtain a thin film having a thickness of from 13 to 50 μ, and the absorption at 3320 cm⁻¹ was measured with use of an infrared spectrophotometer under the same conditions as in Example 14. The $\log(Io/I)/\mu$ value, saponified ethylene-vinyl acetate copolymer concentration, and $m_1$ and $m_2$ values of each layer are shown in Table 20.

Table 20

(Saponified Copolymer Content = 22 % by weight)

| Identification of layer | $\frac{\log(Io/I)}{\mu} \times 10^3$ | Concentration of saponified product (% by weight) | $m_1$ | $m_2$ |
|---|---|---|---|---|
| A-1 | 52.7 | 62 | 2.82 | |
| B-1 | 52.7 | 62 | 2.82 | |
| C-1 | 52.8 | 62 | 2.82 | |
| D-1 | 52.6 | 62 | 2.82 | |
| A-2 | 2.0 | 2.3 | | 0.10 |
| B-2 | 2.0 | 2.3 | | 0.10 |
| C-2 | 1.9 | 2.2 | | 0.10 |
| D-2 | 2.0 | 2.3 | | 0.10 |
| A-3 | 0.4 | 0.5 | | 0.02 |
| B-3 | 0.5 | 0.6 | | 0.03 |

Table 20-continued (Saponified Copolymer Content = 22 % by weight)

| Identification of layer | $\frac{\log(Io/I)}{\mu} \times 10^3$ | Concentration of saponified product (% by weight) | $m_1$ | $m_2$ |
|---|---|---|---|---|
| C-3 | 0.5 | 0.6 | | 0.03 |
| D-3 | 0.5 | 0.6 | | 0.03 |

EXAMPLE 21

A low density polyethylene having the same density, melt index and melt density as those of the low density polyethylene used in Example 18 was melt-extruded at a screw rotation rate of 100 rpm and a resin temperature at the die portion of 240°C. by means of an extruder equipped with a Dulmadge screw having a diameter of 65 mm and a length of 1430 and comprising a mixing zone of 5 flights, and a die having a diameter of 15 mm and a length of 800 mm, and the average flow rate of 16.2 cm/sec was calculated from the amount extruded (75.6 Kg/hr). Separately, a saponified product of an ethylene-vinyl acetate copolymer having the same ethylene content, saponification degree, intrinsic viscosity and melt density as those of the saponified copolymer used in Example 18 was melt-extruded under the same conditions with use of the same extruder as described above, and the average flow rate of 11.8 cm/sec was calculated from the amount extruded (77.1 Kg/hr). Furthermore, an ethylene-vinyl acetate copolymer having the same carbonyl group concentration and melt density as those of the carbonyl group-containing thermoplastic polymer used in Example 18 was melt-extruded under the same conditions with use of the same extruder as described above, and the average flow rate of 15.8 cm/sec was calculated from the amount extruded (80.6 Kg/hr).

100 Parts by weight of a 85 : 15 (weight ratio) mixture of the above-mentioned low density polyethylene and saponified ethylene-vinyl acetate copolymer was incorporated with 15.0 parts by weight of the above-mentioned ethylene-vinyl acetate copolymer and the composition was preliminarily mixed under the same conditions with use of the same apparatus as in Example 10.

The dry-blended composition was melt-extruded under the same conditions with use of the same extruder as described above, and molded into an ellipsoidal bottle having an average thickness of 600 $\mu$, a long axis length of 9 cm and a short axis length of 3 according to a known blow-molding method. At the same operation, the resin pressure at the die portion was 24 Kg/cm².

A prescribed area (a disc having a diameter of 7 cm) was taken from the back face portion (in the long axis direction) of the bottle, and the oxygen permeability was measured under the same conditions with use of the same tester as in Example 14. As a result, the sample was found to have an oxygen permeability of 115 cc/m².day.atm.600 $\mu$.

Samples were collected according to the sampling method described in the text of the specification, and each sample was divided into three layers in the thickness direction with use of a microtome. Each layer had a thickness of about 200 $\mu$.

Each layer sample was pressed under a pressure of 100 Kg/cm² by means of a high pressure press under the same conditions as in Example 14 to obtain a thin film of a thickness of about 26 $\mu$, and the absorption at 3320 cm$^{-1}$ was measured by means of an infrared spectrophotometer under the same conditions as in Example 14. The log(Io/I)/$\overline{\mu}$ value, saponified ethylenevinyl acetate copolymer concentration, and $m_1$ and $m_2$ values are shown in Table 21.

Table 21

(Saponified Copolymer Content = 13 % by weight)

| Identification of layer | $\frac{\log(Io/I)}{\mu} \times 10^3$ | Concentration of saponified product (% by weight) | $m_1$ | $m_2$ |
|---|---|---|---|---|
| A-1 | 13.5 | 16 | 1.23 | |
| B-1 | 13.4 | 16 | 1.23 | |
| C-1 | 13.5 | 16 | 1.23 | |
| D-1 | 13.5 | 16 | 1.23 | |
| A-2 | 10.7 | 13 | 1.00 | |
| B-2 | 10.7 | 13 | 1.00 | |
| C-2 | 10.8 | 13 | 1.00 | |
| D-2 | 10.8 | 13 | 1.00 | |
| A-3 | 8.7 | 10 | | 0.77 |
| B-3 | 8.7 | 10 | | 0.77 |
| C-3 | 8.8 | 10 | | 0.77 |
| D-3 | 8.8 | 10 | | 0.77 |

Example 22

100 parts by weight of a 75 : 25 (weight ratio) mixture of a low density polyethylene having the same physical properties and average flow rate as those of the low density polyethylene used in Example 21 and a saponified product of an ethylene-vinyl acetate copolymer having the same physical properties and average flow rate as those of the saponified copolymer used in Example 21 was incorporated with 15.0 parts by weight of an ethylene-vinyl acetate copolymer (a resin having the same physical properties and average flow rate as those of the carbonyl group-containing thermoplastic polymer used in Example 21), and the composition was preliminarily mixed (dry-blended) under the same conditions with use of the same apparatus as in Example 21.

The dry-blended composition was molded into an ellipsoidal bottle having an average thickness of 600 $\mu$, a long axis length of 9 cm and a short axis length of 3 cm under the same extrusion conditions, with use of the same extruder and according to the same molding method as in Example 21. At this operation, the resin pressure at the die portion was 21 Kg/cm².

A prescribed area (a disc having a diameter of 7 cm) was taken from the back face portion (in the long axis direction) of the bottle, and the oxygen permeability was determined under the same measuring conditions with use of the same tester. As a result, the sample was found to have an oxygen permeability of 89 cc/m².day.atm. 600 $\mu$.

Samples were collected according to the sampling method described in the text of the specification, and each sample was divided into three layers in the thickness direction by means of a microtome. Each layer had a thickness of about 200 $\mu$.

Each layer sample was pressed under a pressure of 150 Kg/cm² by means of a high pressure press under the same conditions as in Example 14 to obtain a thin film having a thickness of about 19 $\mu$, and the absorption at 3320 cm$^{-1}$ was determined with use of an infrared spectrophotometer under the same conditions as in Example 14. The log $(Io/I)\overline{\mu}$ value, saponified ethylene-vinyl acetate copolymer concentration, and $m_1$ and $m_2$ values of each layer are shown in Table 22.

Table 22

(Saponified Copolymer Content = 22 % by weight)

| Identification of layer | $\frac{\log(Io/I)}{\overline{\mu}} \times 10^3$ | Concentration of saponified product (% by weight) | $m_1$ | $m_2$ |
|---|---|---|---|---|
| A-1 | 27.4 | 32 | 1.46 | |
| B-1 | 27.3 | 32 | 1.46 | |
| C-1 | 27.5 | 32 | 1.46 | |
| D-1 | 27.5 | 32 | 1.46 | |
| A-2 | 16.6 | 20 | | 0.91 |
| B-2 | 16.8 | 20 | | 0.91 |
| C-2 | 16.5 | 19 | | 0.86 |
| D-2 | 16.5 | 19 | | 0.86 |
| A-3 | 11.1 | 13 | | 0.59 |
| B-3 | 11.0 | 13 | | 0.59 |
| C-3 | 11.5 | 14 | | 0.64 |
| D-3 | 11.5 | 14 | | 0.64 |

EXAMPLE 23

An isotactic polypropylene having a density of 0.914, a melt index of 1.0 and a density of the melt at 250°C. of 0.721, which had been preliminarily incorporated with 0.01 part by weight, per 100 parts by weight of the polymer, of distearyl-thio-dipropionate and 0.01 part by weight, per 100 parts by weight of the polymer, of 2,6-di-tert-butyl-4-hydroxytoluene as antioxidants, was melt-extruded at a screw rotation rate of 35 rpm and a resin temperature at the die portion of 250°C. by means of an extruder equipped with a metering screw having a diameter of 150 mm and an effective length of 3300 mm, a die having a diameter of 40 mm and a length of 1100 mm, a breaker plate having 273 holes and 5 screens of 120 mesh, and the average flow rate of 9.2 cm/sec was calculated from the amount extruded (301.0 Kg/hr). Separately, a saponified product of an ethylene-vinyl acetate copolymer having an ethylene content of 25.4 mole %, a degree of saponification of 99.2%, an intrinsic viscosity of 0.08 1/g and a density of the melt at 250°C. of 0.966 was melt-extruded under the same conditions with use of the same extruder as described above, and the average flow rate of 10.2 cm/sec was calculated from the amount extruded (448.6 Kg/hr). As the carbonyl group-containing thermoplastic polymer, Surlyn A of the zinc ion type (ionomer produced by Du Pont, U. S. A.) having a carbonyl group concentration of 300 milliequivalents per 100 g of the polymer and a density of the melt at 250°C. of 0.794 was melt-extruded under the same extrusion conditions with use of the same extruder as described above, and the average flow rate of 8.7 cm/sec was calculated from the amount extruded (314.4 Kg/hr).

100 Parts by weight of a 90 : 10 (weight ratio) mixture of the above-mentioned isotactic polypropylene and saponified ethylene-vinyl acetate copolymer was incorporated with 10.0 parts by weight of the above-mentioned Surlyn A, the composition was dry-blended (preliminarily mixed) at room temperature for 5 minutes by means of a dry-blender of the Henschel type.

The dry-blended composition was melt-extruded under the same extrusion conditions with use of the same extruder as described above, and molded into an ellipsoidal bottle having an average thickness of 900 $\mu$, a long axis length of 14 cm and a short axis length of 5 cm according to a known blow-molding method. At this operation, the resin pressure at the die portion was 203 Kg/cm².

A prescribed area (a disc having a diameter of 7 cm) was taken from the back face portion (in the long axis direction) of the bottle, and the oxygen permeability was measured under the same conditions with use of the same tester as in Example 14. As a result, the sample was found to have an oxygen permeability of 42 cc/m².day. atm.900 $\mu$.

Samples was collected according to the sampling method described in the text of the specification, and each sample was divided into three layers in the thickness direction. Each layer had a thickness of about 300 $\mu$.

Each layer sample was pressed under a pressure of 120 Kg/cm² by means of a high pressure press under the same conditions as in Example 14 to obtain a thin film gaving a thickness of about 27 $\mu$, and the absorption at 3320 cm⁻¹ was determined by means of an infrared spectrophotometer under the same conditions as in Example 14. The log(Io/I) $\overline{\mu}$ value, saponified ethylene-vinyl acetate copolymer concentration, and $m_1$ and $m_2$ values of each layer are shown in Tables 23.

Table 23

(Saponified Copolymer Content = 9.1 % by weight)

| Identification of layer | $\frac{\log(Io/I)}{\overline{\mu}} \times 10^3$ | Concentration of saponified product (% by weight) | $m_1$ | $m_2$ |
|---|---|---|---|---|
| A-1 | 5.0 | 5.9 | | 0.65 |
| B-1 | 5.2 | 6.1 | | 0.67 |
| C-1 | 4.8 | 5.7 | | 0.63 |
| D-1 | 5.1 | 6.0 | | 0.66 |
| A-2 | 8.1 | 9.5 | 1.04 | |
| B-2 | 8.1 | 9.5 | 1.04 | |
| C-2 | 8.2 | 9.6 | 1.06 | |
| D-2 | 8.0 | 9.4 | 1.03 | |
| A-3 | 10.1 | 12 | 1.32 | |
| B-3 | 9.9 | 12 | 1.32 | |
| C-3 | 10.2 | 12 | 1.32 | |
| D-3 | 10.1 | 12 | 1.32 | |

EXAMPLE 24

100 parts by weight of a 75 : 15 (weight ratio) mixture of an isotactic polypropylene having the same physical properties and average flow rate as those of the isotactic polypropylene used in Example 23 and a saponfied product of an ethylene-vinyl acetate copolymer having the same properties and average flow rate as those of the saponified copolymer was incorporated with 10.0 parts by weight of Surlyn A (a resin having the same physical properties and average flow rate as those of the carbonyl group-containing thermoplastic polymer used in Example 23), and the composition was preliminarily mixed (dry-blended) under the same conditions with use of the same apparatus as in Example 23.

The dry-blended composition was molded into an ellipsoidal bottle having an average thickness of 900 $\mu$, a long axis length of 14 cm and a short axis length of 5 cm under the same extrusion conditions, with use of the same extruder and according to the same molding method as in Example 23. At this operation, the resin pressure at the die portion was 197 Kg/cm².

A prescribed area (a disc having a diameter of 7 cm) was taken from the back face portion (in the long axis direction) of the bottle, and the oxygen permeability was determined under the same conditions with use of the same tester as in Example 14. As a result, the sample was found to have an oxygen permeability of 7 cc/m².day. atm.900 $\mu$.

Samples were collected according to the sampling method described in the text of the specification, and each sample was divided into three layers in the thickness direction by means of a microtome. Each sample had a thickness of about 300 $\mu$.

Each layer sample was pressed under a pressure of 200 Kg/cm² by means of a high pressure press under the same conditions as in Example 14 to obtain a thin film having a thickness of about 18 $\mu$, and the absorption at 3320 cm$^{-1}$ was measured by means of an infrared spectrophotometer under the same conditions as in Example 14. The log(Io/I)/$\overline{\mu}$ value, saponified ethylene-vinyl acetate copolymer concentration, and $m_1$ and $m_2$ values of each layer are shown in Table 24.

Table 24

(Saponified Copolymer Content = 23 % by weight)

| Identification of layer | $\frac{\log(Io/I)}{\mu} \times 10^3$ | Concentration of saponified product (% by weight) | $m_1$ | $m_2$ |
|---|---|---|---|---|
| A-1 | 14.4 | 17 | | 0.74 |
| B-1 | 14.5 | 17 | | 0.74 |
| C-1 | 14.5 | 17 | | 0.74 |
| D-1 | 14.3 | 17 | | 0.74 |
| A-2 | 10.3 | 22 | | 0.96 |
| B-2 | 10.3 | 22 | | 0.96 |
| C-2 | 10.0 | 23 | | 1.00 |
| D-2 | 10.3 | 22 | | 0.96 |
| A-3 | 25.0 | 30 | 1.31 | |
| B-3 | 25.0 | 30 | 1.31 | |
| C-3 | 24.8 | 29 | 1.26 | |
| D-3 | 25.1 | 30 | 1.31 | |

EXAMPLE 25

A high density polyethylene having a density of 0.954, a melt index of 0.2 and a density of the melt at 240°C. of 0.768, which had been preliminarily incorporated with 0.02 % by weight of stearic acid amide as a lubricant, was melt-extruded at a screw rotation rate of 30 rpm and a resin temperature at the die portion of 240°C. by means of an extruder equipped with a metering screw having a diameter of 150 mm, and an effective length of 3300 mm, a die having a diameter of 40 mm and a length of 1100 mm, one breaker plate having 273 holes and 2 screens of 100 mesh, and the average flow rate of 5.8 cm/sec was calculated from the amount extruded (203.2 Kg/hr). Separately, a saponified product of an ethylene-vinyl acetate copolymer having an ethylene content of 25.4 mole %, a degree of saponification of 99.2 %, an intrinsic viscosity of 0.08 l/g and a density of the melt at 240°C. of 1.025 was melt-extruded under the same conditions with use of the same extruder as described above, and the average flow rate of 8.6 cm/sec was calculated from the amount extruded (402.2 Kg/hr). As the carbonyl group-containing thermoplastic polymer, Surlyn A of the zinc ion type (ionomer produced by Du Pont, U.S.A.) having a carbonyl group concentration of 140 milliequivalents per 100 g of the polymer and a density of the melt at 240°C. of 0.789 was melt-extruded under the same extrusion conditions with use of the same extruder as described above, and the average flow rate of 5.8 cm/sec was calculated from the amount extruded (208.5 kg/hr), 100 Parts by weight of a 90 : 10 (weight ratio) mixture of the above-mentioned high density polyethylene and saponified ethylene-vinyl acetate copolymer was incorporated with 10.0 parts by weight of the above Surlyn A, and the composition was dry-blended (preliminarily mixed) at room temperature for 3 minutes by employing a dry-blender of the Henochel type.

The dry-blended composition was melt-extruded under the same extrusion conditions with use of the same extruder as described above, and molded into an ellipsoidal bottle having an average thickness of 600 $\mu$, a long axis length of 14 cm and a short axis length of 9 cm according to a known blow-molding method. At this operation, the resin pressure at the die portion was 272 Kg/cm².

A prescribed area (a disc having a diameter of 7 cm) was taken from the back face portion (in the long axis direction) of the bottle, and the oxygen permeability was measured under the same conditions with use of the same tester as in Example 14. As a result, the sample was found to have an oxygen permeability of 53 cc/m². day.atm.600 $\mu$.

Samples were collected according to the sampling method described in the text of the specification, and each sample was divided into three layers in the thickness direction by means of a microtome. Each layer had a thickness of about 200 $\mu$.

Each layer sample was pressed under a pressure of 110 Kg/cm² by means of a high pressure press under the same conditions as in Example 14 to obtain a thin film having a thickness of about 52 $\mu$, and the absorption at 3320 cm$^{-1}$ was measured by means of an infrared spectrophotometer under the same conditions as in Example 14. The log (Io/I)/$\overline{\mu}$ value, saponified ethylene-vinyl acetate copolymer concentration, and $m_1$ and $m_2$ values of ench layer are shown in Table 25.

Table 25

(Saponified Copolymer Content = 9.1 % by weight)

| Identification of layer | $\frac{\log(Io/I)}{\mu} \times 10^3$ | Concentration of saponified product (% by weight) | $m_1$ | $m_2$ |
|---|---|---|---|---|
| A-1 | 4.0 | 4.7 | | 0.52 |
| B-1 | 4.1 | 4.8 | | 0.53 |
| C-1 | 3.8 | 4.5 | | 0.49 |
| D-1 | 3.9 | 4.6 | | 0.51 |
| A-2 | 8.5 | 10 | 1.10 | |
| B-2 | 8.6 | 10 | 1.10 | |
| C-2 | 8.5 | 10 | 1.10 | |
| D-2 | 8.6 | 10 | 1.10 | |
| A-3 | 10.7 | 13 | 1.43 | |
| B-3 | 10.5 | 12 | 1.32 | |
| C-3 | 11.0 | 13 | 1.43 | |
| D-3 | 10.9 | 13 | 1.43 | |

For comparison, the above-mentioned high density polyethylene and saponified ethylene-vinyl acetate copolymer were dry-blended at a mixing weight ratio of 91 : 9 under the same conditions with use of the same apparatus as described above.

The resulting dry-blended composition was molded into a bottle having the same configuration and average thickness as described above, under the same extrusion conditions, with use of the same extruder and according to the same molding method as described above.

The resulting bottle molded from the two-component system composition of the high density polyethylene and saponified ethylene-vinyl acetate copolymer and the above-mentioned bottle molded from the three-component system composition of the high density polyethylene, saponified ethylene-vinyl acetate copolymer and Surlyn A were compared and evaluated with respect to transparency and smoothness (degree of aventurine roughness appearing on the body portion of the bottle). The evaluation of transparency was made according to the method described in Example 19. As a result, 6 men of a panel consisting of 25 men replied that the bottle of the two-component system composition was excellent in transparency, and 19 men replied that the bottle of the three-component system composition was excellent in transparency. The evaluation of smoothness was made according to the test method described in Example 19. As a result, 4 men of the panel replied that the bottle of the two-component system composition was of less roughness, and 21 men was replied that the bottle of the three-component system composition was of less roughness.

Ten bottles of the two-component system composition and ten bottles of the three-component system composition were filled with saline water maintained at −5°C. (volume of charged saline water being 450 cc), and they were allowed to stand still a whole day and night in an atmosphere maintained at 0°C. Then, they were let to fall on a concrete floor from a height of 120 cm to know the breakage resistance. The falling test was repeated 10 times on a maximum. In the case of the bottles of the two-component system composition, 5 bottles were broken at the first falling test, and at each of the second, third, 5th, 6th and 9th falling tests, one bottle was broken. In the case of the bottles of the three-component composition, one bottle was broken at the 5th falling test and another bottle was broken at the 6th falling test, but remaining 8 bottles were not broken even when they were subjected to the falling test 10 times.

EXAMPLE 26

100 Parts by weight of a 75 : 25 (weight ratio) mixture of a high density polyethylene having the same physical properties and average flow rate as the high density polyethylene used in Example 25 and a saponified product of an ethylene-vinyl acetate copolymer having the same physical properties and average flow rate as those of the saponified copolymer as used in Example 25 was incorporated with 10.0 parts by weight of Surlyn A (a resin having the same physical properties and average flow rate as those of the carbonyl group-containing thermoplastic polymer used in Example 25), and the composition was preliminarily mixed (dry-blended) under the same conditions with use of the same apparatus as in Example 25.

The dry-blended composition was molded into an ellipsoidal bottle having an average thickness of 600 $\mu$, a long axis length of 14 cm and a short axis length of 5 cm under the same extrusion conditions with use of the same extruder according to the same molding method as in Example 25. At this operation, the resin pressure at the die portion was 259 Kg/cm².

A prescribed area (a disc having a diameter of 7 cm) was taken from the back face portion (in the long axis direction) of the bottle, and the oxygen permeability was determined under the same conditions with use of the same tester as in Example 14. As a result, the sample was found to have an oxygen permeability of 9 cc/m².day.atm.600 $\mu$.

Samples were collected according to the sampling method described in the text of the specification, and each sample was divided into three layers in the thickness direction by means of a microtome. Each layer had a thickness of about 200 $\mu$.

Each layer sample was pressed under a pressure of 170 Kg/cm² by means of a high pressure press under the same conditions as in Example 14 to obtain a thin film hving a thickness of about 16 $\mu$, and the absorption at 3320 cm$^{-1}$ was determined by means of an infrared spectrophotometer under the same conditions as in Example 14. The log($I_o/I$)/$\bar{\mu}$ value, saponified ethylene-vinyl acetate copolymer, and $m_1$ and $m_2$ values of each layer are shown in Table 26.

Table 26

| (Saponified Copolymer Content = 23 % by weight) | | | | |
|---|---|---|---|---|
| Identification of layer | $\frac{\log(I_o/I)}{\bar{\mu}} \times 10^3$ | Concentration of saponified product (% by weight) | $m_1$ | $m_2$ |
| A-1 | 14.1 | 17 | | 0.74 |
| B-1 | 14.0 | 17 | | 0.74 |
| C-1 | 14.3 | 17 | | 0.74 |
| D-1 | 14.2 | 17 | | 0.74 |
| A-2 | 17.7 | 21 | | 0.91 |
| B-2 | 17.8 | | | 0.91 |
| C-2 | 17.7 | | | 0.91 |
| D-2 | 17.8 | 21 | | 0.91 |
| A-3 | 26.0 | 31 | 1.35 | |
| B-3 | 26.0 | 31 | 1.35 | |
| C-3 | 26.0 | 31 | 1.35 | |
| D-3 | 26.0 | 31 | 1.35 | |

EXAMPLE 27

A high density polyethylene having a density of 0.945, a melt index of 0.2 and a density of the melt at 190°C. of 0.78, which had been preliminarily incorporated with 1.0 part by weight, per 100 parts by weight of the polymer, of titanium oxide of the rutile type as a pigment was melt-extruded at a screw rotation rate of 30 rpm and a resin temperature at the die portion of 190°C. by means of an extruder equipped with a metering screw having a diameter of 150 mm and an effective length of 3300 mm and a die having a diameter of 40 mm and a length of 1100 mm, and the average flow rate of 5.2 cm/sec was calculated from the amount extruded (182.2 Kg/hr). Separately, a saponified product of an ethylene-vinyl acetate copolymer having an ethylene content of 25.4 mole %, a degree of saponification of 99.2 %, an intrinsic viscosity of 0.08 l/g and a density of the melt at 190°C. of 1.065 was melt-extruded under the same conditions with use of the same extruder as described above, and the average flow rate of 7.3 cm/sec was calculated from the amount extruded (352.7 Kg/hr). As the carbonyl group-containing thermoplastic polymer, Surlyn A of the sodium ion type (ionomer manufactured by Du Pont, U.S.A.) having a carbonyl group concentration of 210 milliequivalents per 100 g of the polymer and a density of the melt at 190°C. of 0.799 was melt-extruded under the same extrusion conditions with use of the same extruder as described above, and the average flow rate of 5.6 cm/sec was calculated from the amount extruded (201.6 Kg/hr). As the fourth resin, the low density polyethylene used in Example 20 was melt-extruded under the same extrusion conditions with use of the same extruder as described above, and the average flow rate of 6.1 cm/sec was calculated from the amount extruded (210.4 Kg/hr).

100 Parts by weight of a 75 : 25 (weight ratio) mixture of the above-mentioned high density polyethylene and saponified ethylene-vinyl acetate copolymer was incorporated with 5.0 parts by weight of the above-mentioned Surlyn A and 10.0 parts by weight of the above-mentioned low density polyethylene, and the composition was dry-blended (preliminarily mixed) at room temperature for 3 minutes by means of a dry-blender of the Henschel type.

The dry blended composition was melt-extruded under the same extrusion conditions with use of the same extruder as described above, and molded into an ellipsoidal bottle having an average thickness 600 $\mu$, a long axis length of 14 cm and a short axis length of 5 cm according to a known blow-molding method. At this operation, the resin pressure at the die portion was 295 Kg/cm$^2$.

A prescribed area (a disc having a diameter of 7 cm) was taken from the back face portion (in the long axis direction) of the bottle, and the oxygen permeability was determined under the same conditions with use of the same apparatus as in Example 14. As a result, the sample was found to have an oxygen permeability of 6 cc/m$^2$.day.atm.600 $\mu$.

Samples were collected according to the sampling method described in the text of the specification, and each sample was divided into three layers in the thickness direction by means of a microtome. Each layer had a thickness of about 200 $\mu$.

Each layer was pressed under a pressure of 170 Kg/cm$^2$ by means of a high pressure press under the same conditions as in Example 14 to obtain a thin film having a thickness of about 18 $\mu$, and the absorption at 3320 cm$^{-1}$ was measured by means of an infrared spectrophotometer under the same conditions as in Example 14. The $\log(Io/I)/\overline{\mu}$ value, saponified ethylene-vinyl acetate copolymer concentration, and $m_1$ and $m_2$ values of each layer are shown in Table 27.

Table 27

(Saponified Copolymer Content = 22 % by weight)

| Identification of layer | $\dfrac{\log(Io/I)}{\mu} \times 10^3$ | Concentration of saponified product (% by weight) | $m_1$ | $m_2$ |
|---|---|---|---|---|
| A-1 | 13.3 | 16 | | 0.73 |
| B-1 | 13.2 | 16 | | 0.73 |
| C-1 | 13.2 | 16 | | 0.73 |
| D-1 | 13.4 | 16 | | 0.73 |
| A-2 | 17.1 | 20 | | 0.91 |
| B-2 | 17.1 | 20 | | 0.91 |
| C-2 | 17.0 | 20 | | 0.91 |
| D-2 | 17.1 | 20 | | 0.91 |
| A-3 | 24.4 | 29 | 1.32 | |
| B-3 | 24.5 | 29 | 1.32 | |
| C-3 | 24.5 | 29 | 1.32 | |
| D-3 | 24.2 | 29 | 1.32 | |

What we claim is:

1. A resinous composition excellent in processability and gas permeation resistance, which comprises (A) 30 to 98% by weight of a crystalline polyolefin, (B) 2 to 70% by weight of a saponified product of an ethylene-vinyl acetate copolymer having an ethylene content of 25 to 75 mole % and a degree of saponification of at least 93%, and (C) 0.5 to 15 parts by weight, per 100 parts by weight of said polyolefin and ethylenevinyl acetate copolymer saponified product, of a thermoplastic polymer selected from the group consisting of polymers composed of a monomer expressed by the following formula

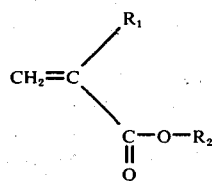

wherein $R_1$ is a hydrogen atom or a lower alkyl group of up to 4 carbon atoms, and $R_2$ is a hydrogen atom or an alkyl group of 1 to 12 carbon atoms.

copolymers of said monomer with an olefin, and copolymers of said monomer with other $\alpha,\beta$-ethylenically unsaturated monomer, said thermoplastic polymer (C) containing carbonyl groups in and amount of 120 to 1400 milliequivalents per 100 g of the polymer (C).

2. A resinous composition excellent in processability and gas permeation resistance which comprises (A) 30 to 98% by weight of a crystalline polyolefin, (B) 2 to 70% by weight of a saponified product of an ethylene-vinyl acetate copolymer having an ethylene content of 25 to 75 mole % and a degree of saponification of at least 93%, and (C) 0.5 to 15 parts by weight, per 100 parts by weight of said polyolefin and ethylene-vinyl acetate copolymer saponified product, of a thermoplastic polymer selected from the group consisting of polymers composed of a monomer expressed by the following formula

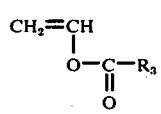

wherein $R_3$ is a hydrogen atom, or an alkyl group of up to 4 carbon atoms or a phenyl group, copolymers of said monomer with an olefin, and copolymers of said monomer with other $\alpha,\beta$-ethylenically unsaturated monomer free of a carbonyl group, said thermoplastic polymer (C) containing carbonyl groups in an amount of 120 to 1400 milliequivalents per 100 g of the polymer (C).

3. A resinous composition excellent in processability and gas permeation resistance, which comprises (A) 30 to 98% by weight of a crystalline polyolefin, (B) 2 to 70% by weight of a saponified product of an ethylene-vinyl acetate copolymer having an ethylene content of 25 to 75 mole % and a degree of saponification of at least 93%, and (C) 0.5 to 15 parts by weight, per 100 parts by weight of said polyolefin and ethylene-vinyl acetate copolymer saponified product, of an ionomer having carbonyl groups in an amount of 120 to 1400 milliequivalents per 100 g of the ionomer.

4. A resinous composition excellent in processability and gas permeation resistance, which comprises (A) 30 to 98% by weight of a crystalline polyolefin, (B) 2 to 70% by weight of a saponified product of an ethylene-vinyl acetate copolymer having an ethylene content of 25 to 75 mole % and a degree of saponification of at least 93%, and (C) 0.5 to 15 parts by weight, per 100 parts by weight of said polyolefin and ethylene-vinyl acetate copolymer saponified product, of a copolymer of maleic anhydride with other α,β-ethylenically unsaturated monomer free of a carbonyl group, said copolymer containing carbonyl groups in an amount of 120 to 1400 milliequivalents per 100 g of the polymer.

5. A resinous molded structure obtained by melt-extrusion molding a resinous composition which comprises (A) 30 to 98 % by weight of a crystalline polyolefin (B) 2 to 70% by weight of a saponified product of an ethylene-vinyl acetate copolymer having an ethylene content of 25 to 50 mole %, a degree of saponification of at least 99% and an intrinsic viscosity ($\eta$), measured at 30°C. in a mixed solvent of 85% by weight of phenol and 15% by weight of water, of from 0.07 to 0.17 l/g and (C) 0.5 to 15 parts by weight, per 100 parts by weight of said polyolefin and ethylene-vinyl acetate copolymer saponified product, of a thermoplstic polymer having carbonyl groups in an amount of 120 to 1400 milliequivalents per 100 g of the polymer (C), said thermoplastic polymer (C) being selected from the group consisting of
  i. polymers composed of a monomer expressed by the following formula

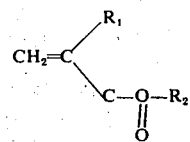

wherein $R_1$ is a hydrogen atom or a lower alkyl group of up to 4 carbon atoms, and $R_2$ is a hydrogen atom or an alkyl group of 1 to 12 carbon atoms.
copolymers of said monomer with an olefin, and copolymers of said monomer with other α,β-ethylenically unsaturated monomer,
  ii. polymers composed of a monomer expressed by the following formula

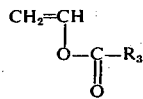

wherein $R_3$ is a hydrogen atom, or an alkyl group of up to 4 carbon atoms or a phenyl group,
copolymers of said monomer with an olefin, and copolymers of said monomer with other α,β-ethylenically unsaturated monomer free of a carbonyl group,
  iii. an ionomer, and
  iv. a copolymer of maleic anhydride with other α,β-ethylenically unsaturated monomer free of a carbonyl group.

6. A resinous molded structure set forth in claim 5, which is in the form of a container.

7. A resinous moled structure set forth in claim 5, which is in the form of a film.

8. A resinous molded structure set forth in claim 5, which is in the form of a tube.

* * * * *